US010796316B2

(12) United States Patent
Wang et al.

(10) Patent No.: US 10,796,316 B2
(45) Date of Patent: Oct. 6, 2020

(54) METHOD AND SYSTEM FOR IDENTIFYING FRAUDULENT PUBLISHER NETWORKS

(71) Applicant: Yahoo Holdings, Inc., Sunnyvale, CA (US)

(72) Inventors: Liang Wang, San Jose, CA (US); Angus Xianen Qiu, Sunnyvale, CA (US); Chun Han, Fremont, CA (US); Teppo Salonen, Temple City, CA (US)

(73) Assignee: Oath Inc., New York, NY (US)

( * ) Notice: Subject to any disclaimer, the term of this patent is extended or adjusted under 35 U.S.C. 154(b) by 308 days.

(21) Appl. No.: 15/782,599

(22) Filed: Oct. 12, 2017

(65) Prior Publication Data

US 2019/0114649 A1 Apr. 18, 2019

(51) Int. Cl.
*G06Q 30/00* (2012.01)
*G06Q 30/02* (2012.01)
*H04L 29/06* (2006.01)

(52) U.S. Cl.
CPC ......... *G06Q 30/0185* (2013.01); *G06Q 30/02* (2013.01); *G06Q 30/0248* (2013.01); *H04L 63/1408* (2013.01); *H04L 63/1483* (2013.01)

(58) Field of Classification Search
None
See application file for complete search history.

(56) References Cited

U.S. PATENT DOCUMENTS

| | | | | |
|---|---|---|---|---|
| 8,600,872 | B1* | 12/2013 | Yan | G06Q 40/02 705/35 |
| 9,152,977 | B2* | 10/2015 | Zwicky | G06Q 30/02 |
| 9,294,497 | B1* | 3/2016 | Ben-Or | H04L 63/1433 |
| 2005/0278550 | A1* | 12/2005 | Mahone | H04M 15/00 713/189 |
| 2007/0064697 | A1* | 3/2007 | Nesbitt | H04L 61/6068 370/392 |
| 2007/0255821 | A1* | 11/2007 | Ge | G06Q 10/00 709/224 |
| 2008/0162475 | A1* | 7/2008 | Meggs | G06Q 30/02 |
| 2009/0018940 | A1* | 1/2009 | Wang | G06O 40/00 705/35 |
| 2009/0157417 | A1* | 6/2009 | Bradley | G06Q 30/0185 705/318 |

(Continued)

OTHER PUBLICATIONS

STIC EIC 3600 Search Report for application 15782599 dated Apr. 14, 2020 (Year: 2020).*

(Continued)

*Primary Examiner* — Matthew T Sittner
(74) *Attorney, Agent, or Firm* — Pillsbury Winthrop Shaw Pittman LLP

(57) ABSTRACT

The present teaching generally relates to detecting fraudulent networks. First data associated with a plurality of entities may be obtained, and a representation characterizing similarities among the plurality may be generated. Based on the representation, at least one entity cluster may be identified as corresponding to a candidate fraud network. A score associated with each of the at least one entity cluster may be determined, where the score indicates a likelihood that a corresponding entity cluster represents a fraud network, and at least some of the at least one entity cluster may be identified as a fraud network based on the score.

20 Claims, 17 Drawing Sheets

(56) References Cited

U.S. PATENT DOCUMENTS

| | | | | |
|---|---|---|---|---|
| 2009/0248438 A1* | 10/2009 | Tyler | ...................... | G06Q 50/22 705/2 |
| 2010/0082400 A1* | 4/2010 | Bagherjeiran | ......... | G06Q 30/02 705/14.47 |
| 2010/0262693 A1* | 10/2010 | Stokes | ................ | H04L 63/1408 709/225 |
| 2011/0184838 A1* | 7/2011 | Winters | ................. | G06Q 20/10 705/27.1 |
| 2011/0314557 A1* | 12/2011 | Marshall | ............ | G06Q 30/0241 726/27 |
| 2012/0173710 A1* | 7/2012 | Rodriguez | .............. | H04L 43/04 709/224 |
| 2013/0031061 A1* | 1/2013 | Jagota | ..................... | G06Q 30/01 707/690 |
| 2013/0305356 A1* | 11/2013 | Cohen-Ganor | ....... | G06F 21/566 726/22 |
| 2014/0149208 A1* | 5/2014 | Zwicky | .............. | G06Q 30/0225 705/14.45 |
| 2015/0026070 A1* | 1/2015 | Groarke | ............. | G06Q 20/4016 705/64 |
| 2015/0032533 A1* | 1/2015 | Raab | .................. | G06Q 30/0248 705/14.47 |
| 2016/0260129 A1* | 9/2016 | Fadeev | .................... | H04L 67/22 |
| 2016/0344738 A1* | 11/2016 | Dotan | ................. | H04L 63/0263 |
| 2016/0350800 A1* | 12/2016 | Qiu | .................... | G06Q 30/0277 |
| 2016/0350815 A1* | 12/2016 | Qiu | .................... | G06Q 30/0248 |
| 2017/0093650 A1* | 3/2017 | Predovic | ................. | H04L 67/22 |
| 2019/0114649 A1* | 4/2019 | Wang | ................. | H04L 63/1408 |

OTHER PUBLICATIONS

STIC EIC 3600 Search Report for application 15782599 dated Oct. 28, 2019 (Year: 2019).*

Extended European Search Report dated Dec. 5, 2018 in European Application 18195652.5.

Office Action dated May 30, 2019 in Taiwanese Application No. 107130924.

Office Action dated Feb. 10, 2020 in Taiwanese Application No. 107130924.

* cited by examiner

METHOD AND SYSTEM FOR IDENTIFYING FRAUDULENT PUBLISHER NETWORKS

BACKGROUND

1. Technical Field

The present teaching generally relates to fraudulent network detection. More specifically, the present teaching relates to identifying fraudulent publisher networks within Internet advertising.

2. Technical Background

In the age of the Internet, advertising is a main source of revenue for many Internet companies. Traditionally, providers of goods/services and/or advertising agencies provide advertisements to be displayed on different platforms. With the development of the Internet, more and more advertisements may be offered via Internet applications.

Publishers may earn revenue by advertising on websites. The greater the volume of traffic at that website, the greater the revenue for the publisher. However, as can be the case in many aspects of society, dishonest and phony behavior may occur as individuals attempt to make money through fraudulent advertisement schemes. For example, an individual—a cybercriminal—may pretend to be a publisher, create a website and/or overtake a known site, simulate traffic, and earn revenue. Further, as techniques to detect these types of behaviors have been developed, cyber criminals have found new and more advanced ways to circumvent the system. As another example, instead of using a single website, cyber criminals may employ multiple websites that individually do not obtain a large sum of revenue, but when combined, may yield the cybercriminal with a trove of money. The use of multiple websites, in this example, enables the cybercriminal to avoid detection as each site on its own does not raise any red flags due to the low monetary values associated therewith.

Thus, there is a need for methods and systems that minimize and/or prevent such fraudulent behaviors. In particular, there is a need for systems and methods that are capable of detecting fraudulent publish networks. The present teaching aims to address these issues.

SUMMARY

The teachings disclosed herein relate to methods, systems, and programming for fraudulent network detection. More particularly, the present teaching relates to methods, systems, and programming related to identifying one or more fraudulent networks within a network cluster.

In one example, a method, implemented on a machine having at least one processor, storage, and a communication platform capable of connecting to a network for detecting fraudulent networks is described. First data associated with a plurality of entities may be obtained. A representation characterizing similarities among the plurality may be generated. Based on the representation, at least entity cluster may be identified as corresponding to a candidate fraud network. A score associated with each of the at least one entity cluster may be determined, the score indicating a likelihood that a corresponding entity cluster represents a fraud network, and at least some of the at least one entity cluster may be identified as a fraud network based on the score.

In a different example, a system having at least one processor, storage, and a communication platform capable of connecting to a network for detecting fraudulent networks is described. The system may include a graph generation system, a network identification system, and a network scoring system. The graph generation system may be configured to obtain first data associated with a plurality of entities, and generate a representation characterizing similarities among the plurality. The network identification system may be configured to identify, based on the representation, at least one entity cluster as corresponding to a candidate fraud network. The network scoring system may be configured to determine a score associated with each of the at least one entity cluster, the score indicating a likelihood that a corresponding entity cluster represents a fraud network, and identify at least of the at least one entity cluster as a fraud network based on the score.

Other concepts relate to software for implementing the present teaching on detecting fraudulent networks. A software product, in accord with this concept, includes at least one machine-readable non-transitory medium and information and/or instructions stored thereon. The instructions stored on the medium may include executable program code data, parameters in association with the executable program code, and/or information related to a user, a request, content, or information related to a social group, etc.

In one example, a machine-readable, non-transitory and tangible medium having instructions recorded thereon for detecting fraudulent networks is described. The information, when executed by at least one processor of a computing system, causes the computing system to obtain first data associated with a plurality of entities; generate a representation characterizing similarities among the plurality; identify, based on the representation, at least one entity cluster as corresponding to a candidate fraud network; determine a score associated with each of the at least one entity cluster, the score indicating a likelihood that a corresponding entity cluster represents a fraud network; and identify at least some of the at least one entity cluster as a fraud network based on the score.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
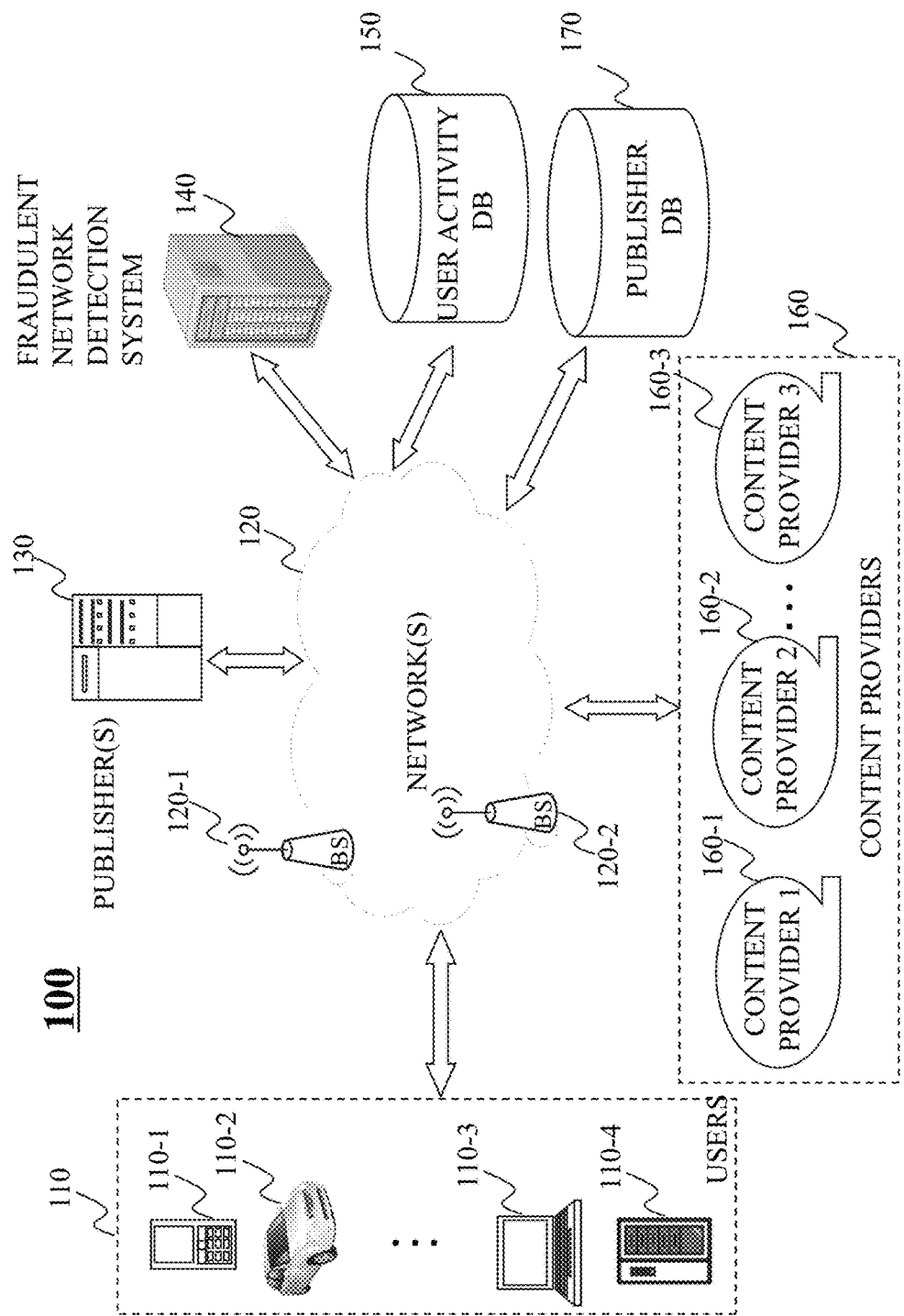
FIG. 1A is an illustrative diagram of an exemplary system for detecting fraudulent networks, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to fraudulent publisher network detection realized as a specialized and networked system by utilizing one or more computing devices (e.g., mobile phone, personal computer, etc.) and network communications (wired or wireless). The disclosed teaching on fraudulent publisher network detection includes, but is not limited to, detecting one or more publishers within a collection of publishers whose behaviors, as well as other characteristics, indicate a strong likelihood of fraudulent activity.

Publishers may earn revenue by providing and displaying advertisements on websites. Generally speaking, the greater the number of visitors (e.g., traffic) at that website where the advertisement is displayed, the greater the revenue for the publisher. However, dishonest and fraudulent individuals, companies, etc., may use these same principles to collect money under false pretenses. For example, a fraudulent user, which as described herein may correspond to any individual, group of individuals, business, and/or entity, that is attempting to obtain revenue under false pretenses, may create websites and/or take over an existing website, simulate traffic, and earn revenue via that traffic. This problem may be further compounded by fraudulent users who create multiple sites, each of which only collects a smaller amount of money. This may allow the fraudulent users to go unnoticed, as no one website generates enough money to raise suspicion, however collectively the sites may bring in a larger amount of revenue for the fraudster.

In order to for fraudulent users to simulate traffic for each website created, the fraudulent users may need certain data. For example, and without limitation, user devices, browser cookies, internet protocol ("IP") addresses, user agent strings, and the like, may be needed in order to simulate believable traffic. As an illustrative example, multiple browser cookies may be generated by repeatedly extracting a browser cookie from a web browser's cache file, clearing that browser's browsing history, and browsing again thereby generating a new browser cookie. In certain scenarios, fraudulent users may take those extracted browser cookies and place them on additional user devices so that different devices share one or more same browser cookies. User agent strings may also be fraudulently created using web automation tools to alter the user agent string. This, for example, may allow a user agent string that is initially declared as being for one type of operating system to be modified such that it declares itself as being for a different type of operating system. While changing/modifying IP addresses is slightly more difficult, fraudulent users may employ IP botnets or cloud servers to acquire IP addresses, which may even be shared amongst fraudulent users across multiple websites.

FIG. 1A is an illustrative diagram of an exemplary networked environment for detecting fraudulent networks, in accordance with various embodiments of the present teaching. In FIG. 1A, an exemplary networked environment 100 includes may include one or more user devices 110, one or more publishers 130, one or more content providers 160, and a fraudulent network detection system 140, each of which may be capable of communicating with one another via one or more networks 120. Network(s) 120, in some embodiments, may be a single network or a combination of different networks. For example, network(s) 120 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 120 may also include various network access points. For example, environment 100 may include wired or wireless access points such as, and without limitation, base stations or Internet exchange points 120-1 . . . 120-2. Base stations 120-1, 120-2 may facilitate, for example, communications to/from user devices 110 with one or more other components of environment 100 across network(s) 120.

User devices 110 may be of different types to facilitate one or more users operating user devices 110 to connect to network(s) 120. User devices 110 may correspond to any suitable type of electronic device including, but not limited to, desktop computers 110-*d*, mobile devices 110-*c* (e.g., mobile phones, smart phones, personal display devices, personal digital assistants ("PDAs"), gaming consoles/devices, wearable devices (e.g., watches, pins/broaches, headphones, etc.), transportation devices 110-*b* (e.g., cars, trucks, motorcycles, boats, ships, trains, airplanes), mobile computers 110-*c* (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user, in one embodiment, may send data (e.g., a request) and/or receive data (e.g., content) via user devices 110.

Content providers 160 may include one or more content providers 160-1, 160-2, and 160-3, in some embodiments. Although three content providers are shown within environment 100, any number of content providers may be included. Content providers 160 may correspond to any suitable content source, such as, and without limitation, an individual, a business, an organization, and the like, which may be referred to herein collectively as an "entity" or "entities." For example, content providers 160 may correspond to a government website, a news site, a social media website, and/or a content feed source (e.g., a blog). In some embodiments, content providers 160 may be vertical content sources. Each entity 104 is configured to generate and send content to one or more of user devices 102 via one or more networks 106. The content (e.g., a webpage) may include information consumable by user 120, for instance, as well as one or more advertisements 118. In the illustrative embodiment, entities 104 may establish a communications link 112 with network(s) 106, which in turn provides the content to user devices 102 via a communications link 108. Furthermore, user devices 102 may communicate with entities 104, a user activity detection system 110, and/or any other suitable device/system, via communications links 108 (as well as 112).

Publishers 130 may correspond to one or more publishers that publish content and/or advertisements. For example, publishers 130 may be configured to present content obtained from one or more of content providers 160. In some embodiments, publishers 130 may present one or more advertisements thereon, which may be selected from an advertisement database, an advertisement source, and/or any other suitable entity (e.g., content provider 160). In some embodiments, publishers 130 configured to provide product(s) and/or service(s), and may be configured to handle the advertising process for its own product(s) and/or a service (e.g., websites, mobile applications, etc.) related to advertising, or a combination thereof. For example, publishers 130 may include such systems as an advertising agency or a dealer of advertisement that operates a platform that connects an advertiser or advertising agency one or more additional entities.

Advertisements may be obtained from a plurality of sources, which may be stored within an advertisement database. Furthermore, different ads may be of different types, and online content may include one or more advertisements of two or more advertisement types. The various advertisement types may include, but are not limited to, streaming content, static content, sponsored content, and/or any combination thereof. For example, static content may include text, image, audio, or any rich media combination thereof. Each advertisement may be placed at any location of the online content (e.g., a content page, mobile app), and may be presented both as part of a content stream as well as a standalone advertisement, rendered strategically around or within the content stream. The various types of content sources may include, but are not limited to, online news, published papers, blogs, on-line tabloids, magazines, audio content, image content, and video content. The content sources, such as content providers 160, may alternatively, or additionally, correspond to a content portal presenting content originated from a content provider. The content obtained from such content sources may include, but is not limited to, multi-media content, text, or any other form of content comprised of website content, social media content, or any other content originator. The content further may be licensed content and/or content crawled and indexed from various sources on the Internet. Each ad may be stored with some textual information related to that ad, including a description of what that ad is about as well as additional information such as intended audience of the ad, which may be identified via such parameters as demographics of the intended audience, geographical locations where the ad is to be displayed, and/or time frame(s) when the ad is to be presented to the intended audience. In some embodiments, content providers 160 and publishers 130 may correspond to a same entity, such as an entity configured to provide content and advertisements, and the aforementioned illustration is merely exemplary.

For a given online session in which a user device 110 accesses online content provided by one of publishers 130, the online content may be presented and rendered on user device 110 with one or more advertisements. The number of advertisements may depend on a number/quantity of ad-space capable of being present with the online content. For each ad-space, publishers 130 requests an advertisement from an ad server and content from content providers 160, and the ad selected is to be rendered in the intended online content's (e.g., webpage) ad-space. After obtaining the selected ads for each ad-space associated with the particular online content, publisher 130 may send the online content including the corresponding selected ads to user device 110 so that the online content including the selected ads may be rendered.

In requesting an advertisement to be displayed to user device 110 with the online content (e.g., a webpage), publishers 130 may provide contextual information related to the online content and/or the particular user (e.g., a user associated with user device 110). User activity events, such as, and without limitation, user interactions associated with an advertisement displayed with the online content, may also be monitored and stored within user activity database 150.

Fraudulent network detection system 140, in some embodiments, may be configured to identify one or more fraudulent publishers, or clusters of fraudulent publishers. As described in greater detail herein, fraudulent network detection system 140 may obtain publisher data from publisher database 170, which may include labels reflective of a publishers status as being one of (or at least one of) fraudulent or non-fraudulent. Using user activity data obtained from user activity database 150, representations (e.g., publisher graph(s)) may be generated that indicate one or more similarities existing between two or more publishers. Within the representation, highly connected clusters of publishes may be identifiable, and fraud scores may be determined for each cluster. The fraud score, as described herein, may reflect a likelihood that a particular publisher is fraudulent based on data associated with that publisher. Fraudulent network detection system 140 may determine whether the fraud score for a publisher exceeds a threshold, and if so, may generate a data flag (e.g., metadata) indicating that the particular publisher is likely fraudulent. If not, fraudulent network detection system 140 may generate a data flag that indices that the particular publisher is likely not fraudulent. The flag for each publisher may then be stored within a publisher database 170.

Persons of ordinary skill in the art will recognize that although user activity database 150 and publisher database 170 are illustrated as being communicable via network(s) 120, one or more of user activity database 150 and publisher database 170 may be communicable via publisher(s) 130, fraudulent network detection system 140, and/or content providers 160 without network(s) 120.

Figure 1B:
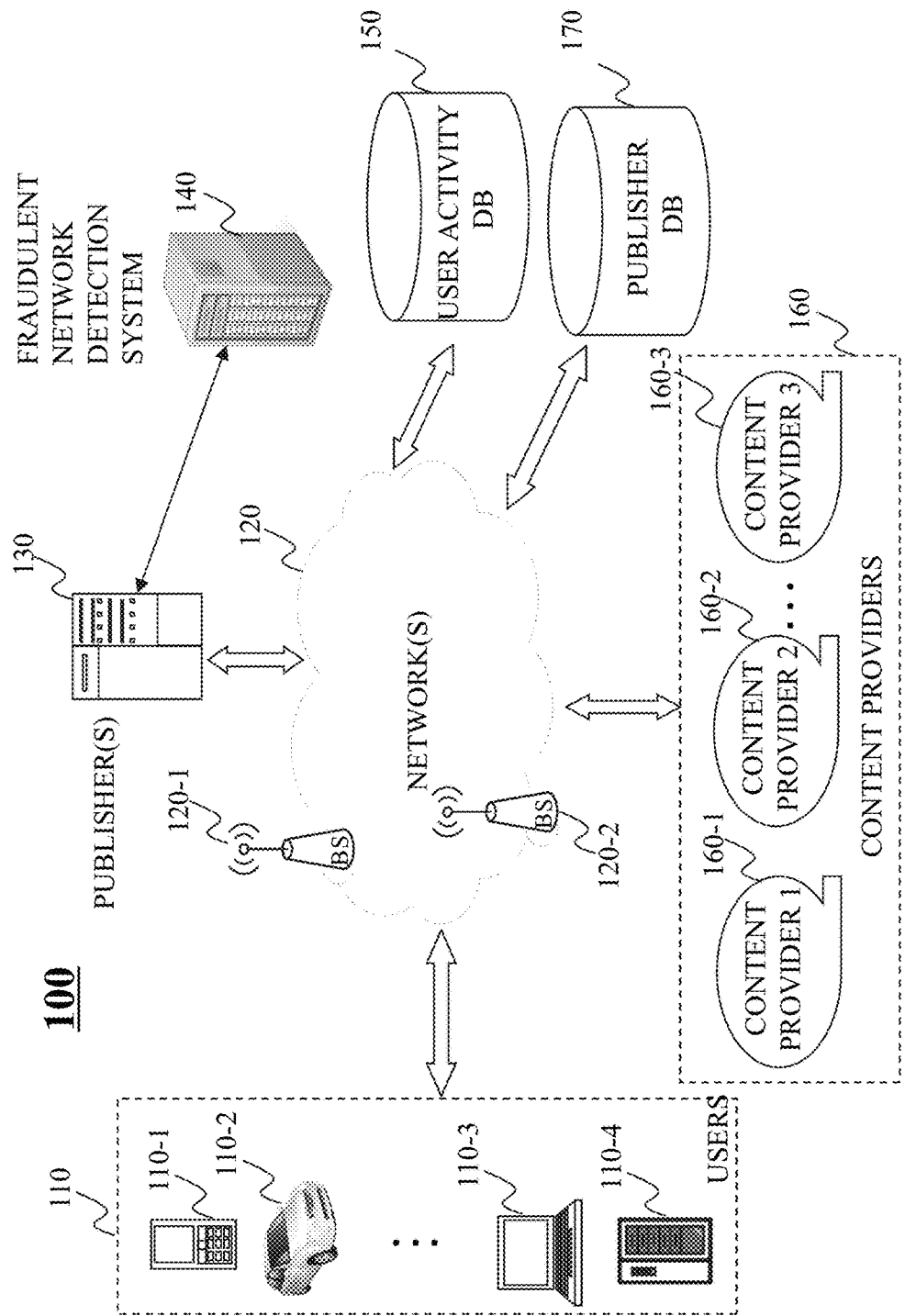
FIG. 1B is another illustrative diagram of an exemplary networked environment for detecting fraudulent networks, in accordance with various embodiments of the present teaching.

FIG. 1B is another illustrative diagram of an exemplary networked environment for detecting fraudulent networks, in accordance with various embodiments of the present teaching. Networked environment 150 of FIG. 1B, in one illustrative embodiment, may be substantially similar to networked environment 100 of FIG. 1A, with the exception that fraudulent network detection system 140 may serve as a backend system for publisher(s) 130.

Figure 2A:
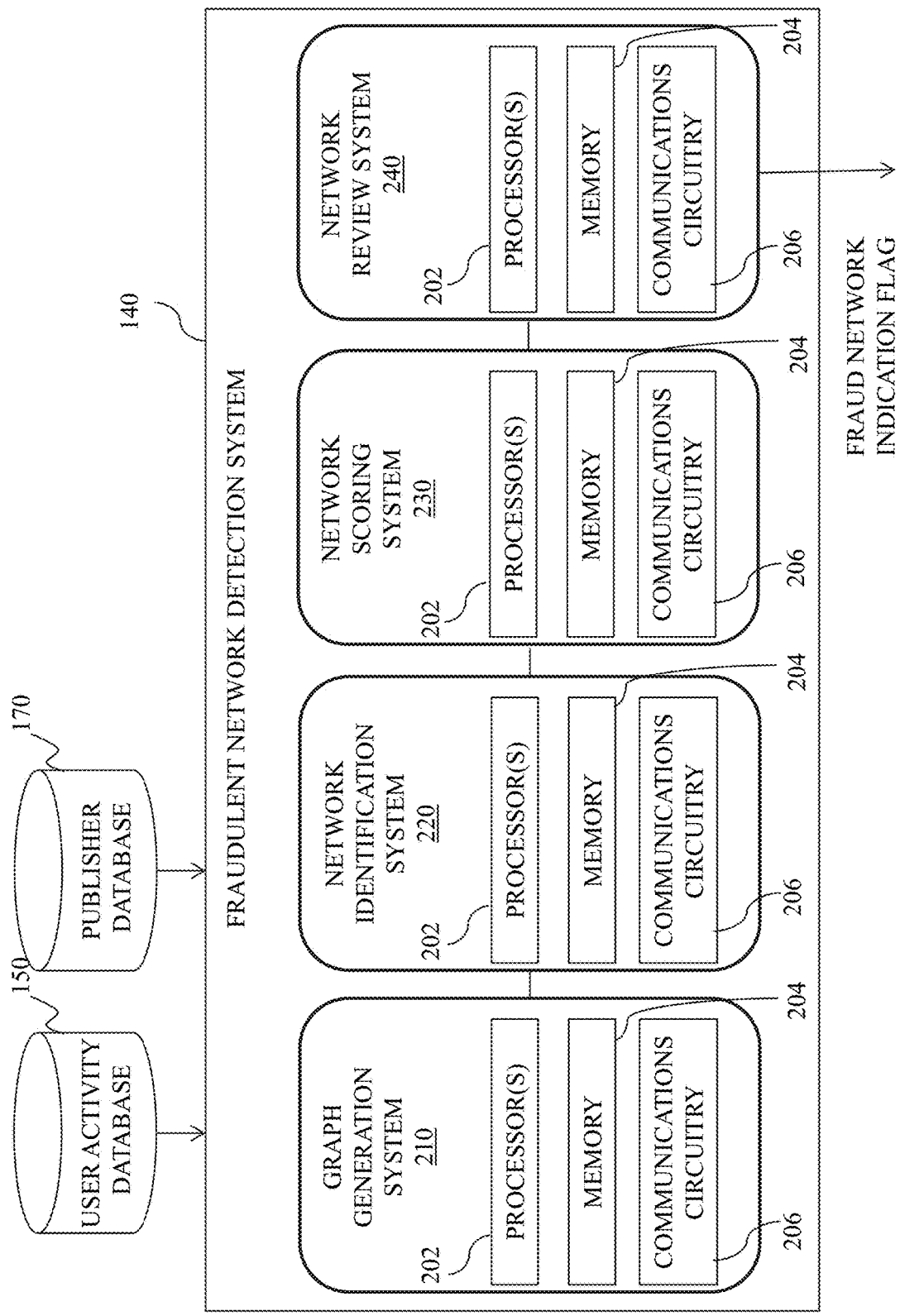
FIG. 2A is an illustrative diagram of an exemplary fraudulent network detection system, in accordance with various embodiments of the present teaching.

FIG. 2A is an illustrative diagram of an exemplary fraudulent network detection system, in accordance with various embodiments of the present teaching. Fraudulent network detection system 140, in a non-limiting embodiment, may include a graph generation system 210, a network identification system 220, a network scoring system 230, and a network review system 240. Each of graph generation system 210, network identification system 220, network scoring system 230 and network review system 240 may include one or more processors 202, memory 204, and communications circuitry 206.

Processor(s) 202 may include any suitable processing circuitry capable of controlling operations and functionality of one or more components/modules of fraudulent network detection system 140, as well as facilitating communications between various components within fraudulent network detection system 140 and/or with one or more other systems/components of network environments 100, 150. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 402 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 402 may include its own local memory, which may store program systems, program data, and/or one or more operating systems. However, processor(s) 202 may run an operating system ("OS") for one or more components of fraudulent network detection system 140 and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by user device(s) 110.

Memory 204 may include one or more types of storage mediums such as any volatile or non-volatile memory, or any removable or non-removable memory implemented in any suitable manner to store data for fraudulent network detection system 140. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 204 may be implemented as computer-readable storage media ("CRSM"), which may be any available physical media accessible by processor(s) 202 to execute one or more instructions stored within memory 204. In some embodiments, one or more applications (e.g., gaming, music, video, calendars, lists, etc.) may be run by processor(s) 202, and may be stored in memory 204.

Communications circuitry 206 may include any circuitry allowing or enabling one or more components of fraudulent network detection system 140 to communicate with one another, and/or with one or more additional devices, servers, and/or systems. In some embodiments, communications between one or more components of fraudulent network detection system 140 may be communicated with user devices 110, publisher(s) 130, content provider(s) 160, and/or databases 150 and/or 170 via communications circuitry 206. For example, network(s) 120 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of user activity detection system 110 and/or to/from fraudulent network detection system 140, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, one or more components of fraudulent network detection system 140 may include one or more antennas to facilitate wireless communications with a network using various wireless technologies (e.g., Wi-Fi, Bluetooth, radiofrequency, etc.). In yet another embodiment, one or more components of user activity detection system may include one or more universal serial bus ("USB") ports, one or more Ethernet or broadband ports, and/or any other type of hardwire access port so that communications circuitry 206 facilitates communications with one or more communications networks.

Graph generation system 210, in some embodiments, may be configured to generate one or more publisher graphs indicating a similarity between two or more publishers of publishers 130. In some embodiments, as describes in greater detail below, the similarity between two or more publishes may be calculated using data such as, but not limited to, shared browser cookies, device identifiers, IP addresses, and/or user agent strings obtain from publisher(s) 130.

Network identification system 220, in some embodiments, may be configured to identify highly connected clusters with publisher graphs produced by graph generation system 210. In some embodiments, as described in greater detail below, the identified clusters may represent candidate fraud networks. Network identification system 220 may be configured to use one or more algorithms to identify/separate out clusters within the publisher graph and/or publisher data.

Network scoring system 230 may, in some embodiments, be configured to determine a fraud score to each cluster identified by network identification system 220. The fraud score may be a value attributed to a particular cluster using one or more machine learning models, as described in greater detail below. For example, the fraud score may correspond to a numerical value between zero (e.g., "0") and one hundred (e.g., "100"). In this particular example, a fraud score of zero may indicate that a cluster is not likely to be fraudulent, whereas a fraud score of one hundred may indicate a high likelihood that a cluster is fraudulent. In some embodiments, network scoring system 230 may be configured to determine which, if any, clusters have a fraud score that exceeds a threshold value. The threshold value may be pre-determined and/or configurable.

Fraud scores determined to be in excess of the threshold value may be provided to network review system 240 for further analysis to determine whether that particular cluster corresponds to a fraudulent network. As described in greater detail below, network review component 240 may be configured to flag certain publishers identified as being fraudulent, or associated with a cluster deemed to be fraudulent and/or behaving in a fraudulent manner. Each flag may be stored within publisher database 170 such that, if a request is received from that publisher, no advertisement will be provided thereto.

Figure 2B:
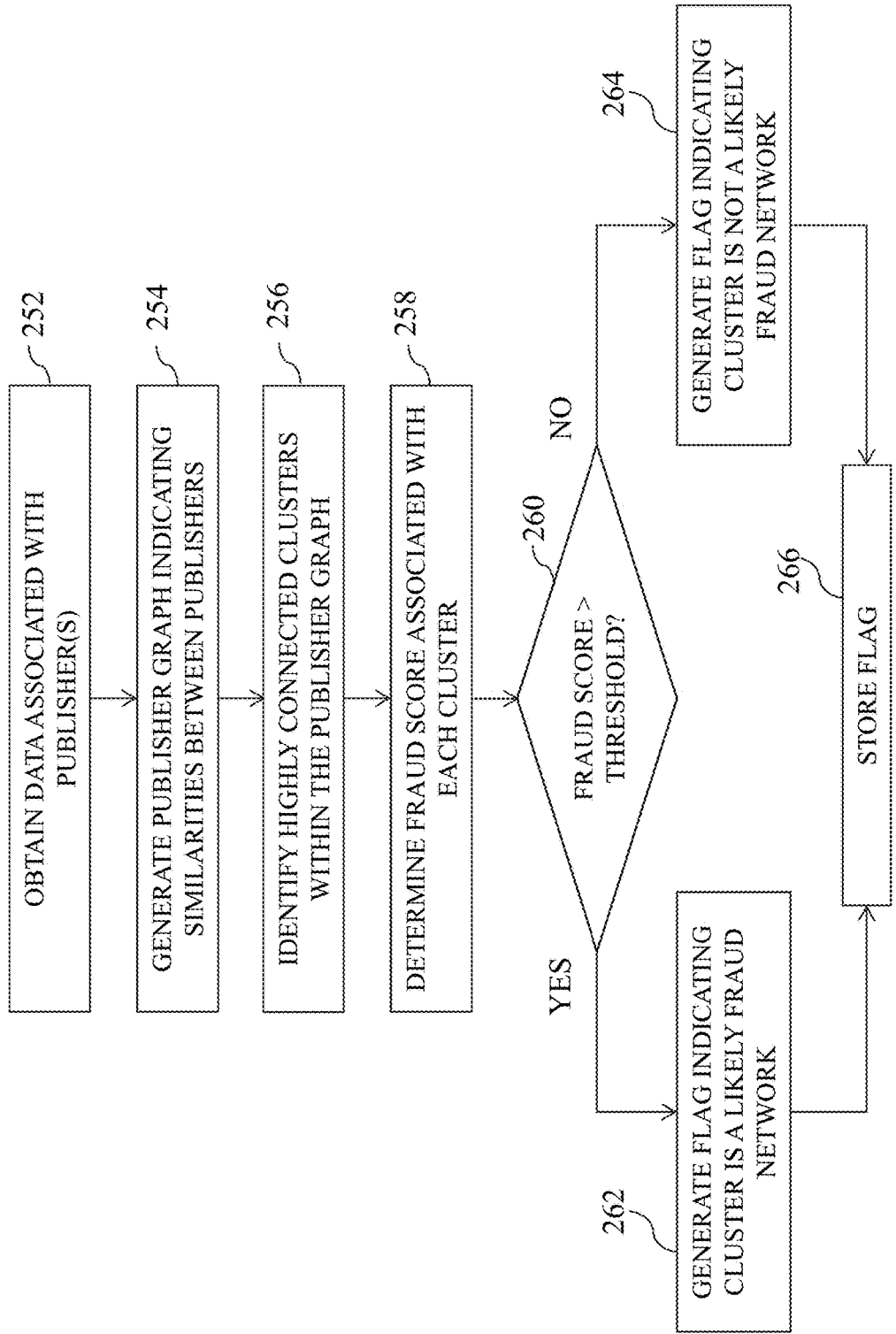
FIG. 2B is an illustrative flowchart of an exemplary process for determining fraudulent networks, in accordance with various embodiments of the present teaching.

FIG. 2B is an illustrative flowchart of an exemplary process for determining fraudulent networks, in accordance with various embodiments of the present teaching. Process 250, in a non-limiting embodiment, may begin at step 252. At step 252, data associated with one or more publishers may be obtained. For example, graph generation system 210 may obtain data associated with one or more publishers from publisher database 170. In some embodiments, data may also be obtained representative of user activity associated with one or more publishers. The various types of data that may be obtained, for instance by graph generation system 210 may include, but are not limited to, publisher labels, IP addresses associated with those publishers, user agent strings, browsers cookies, and various other features related to each publisher.

At step 254, a publisher graph may be generated, where the publisher graph may indicate similarities between two or more publishers. In some embodiments, multiple graphs may be generated, where each graph indicates a relationship between two or more publishers. For example, a bipartite graph may be generated, which may indicate which features relate to which publishers. As another example, a unipartite graph may be generated which indicates how similar (e.g., related) the features of one publisher is/are to another publisher. Depending on the available data, the graph(s) that may be generated can be fairly large (e.g., greater than 100 nodes, greater than 500 nodes, etc.). In some embodiments, a threshold may be applied to reduce the number of nodes in a graph. For instance, a threshold may be employed that restricts the publisher graph to only include publishers whose features overlap in excess of the threshold. As an illustrative example, if two publishers have 100 overlapping IP addresses, and the threshold is set at 5 overlapping IP addresses, then these two publishers may be included within the graph.

At step 256, highly connected clusters within the publisher graph may be identified. Highly connected clusters may be determined by identifying regularity within the graph. By identifying regularity, the graph data may be compresses, thereby revealing partitions that yield a minimum description length between nodes. In some embodiments, network identification system 220 may be configured to identify the highly connected clusters within the publisher graph(s).

At step 258, a fraud score associated with each cluster identified at step 256 may be determined. In some embodiments, network scoring system 230 may be configured to determine the fraud score associated with each identified cluster. The fraud score for each network may indicate a likelihood that the corresponding network is fraudulent. In one embodiment, the fraud score may be a numerical value. For example, the fraud score may correspond to a number between 0 and 100, 0 and 1,000, or within any other suitable range. In this particular scenario, the higher the fraud score, the more risky that particular network may be. Alternatively, however, the lower the fraud score, the more risky that particular network may be. However, persons of ordinary skill in the art will recognize that the fraud score may be represented using any suitable criteria (e.g., letter grade, category, etc.), and the aforementioned is merely illustrative.

At step 260, a determination may be made as to whether or not the fraud score for each network is greater than a fraud score threshold. In some embodiments, the fraud score threshold may be set by a user, a system (e.g., fraudulent network detection system 140), or may be pre-set. If, at step 260, it is determined that the fraud score is greater than the threshold, then a flag may be generated that indicates that the corresponding cluster is a likely fraud network. However, if at step 260 it is determined that the fraud score is less than or equal to the threshold, then a flag may be generated that indicates that the corresponding cluster is not a likely fraud network. In some embodiments, the flag may correspond to metadata attributed to data associated with a particular network/cluster of publishers. For example, for a particular cluster of publishers, metadata (e.g., a logical 0/1, True/False, etc.) may be generated and attributed to each publisher's label to indicate whether or not that corresponding publisher is likely part of a fraudulent network. At step 266, the flag for each cluster may be stored. For example, the flag may be stored in publisher database 170 along with each publisher entry.

Figure 3A:
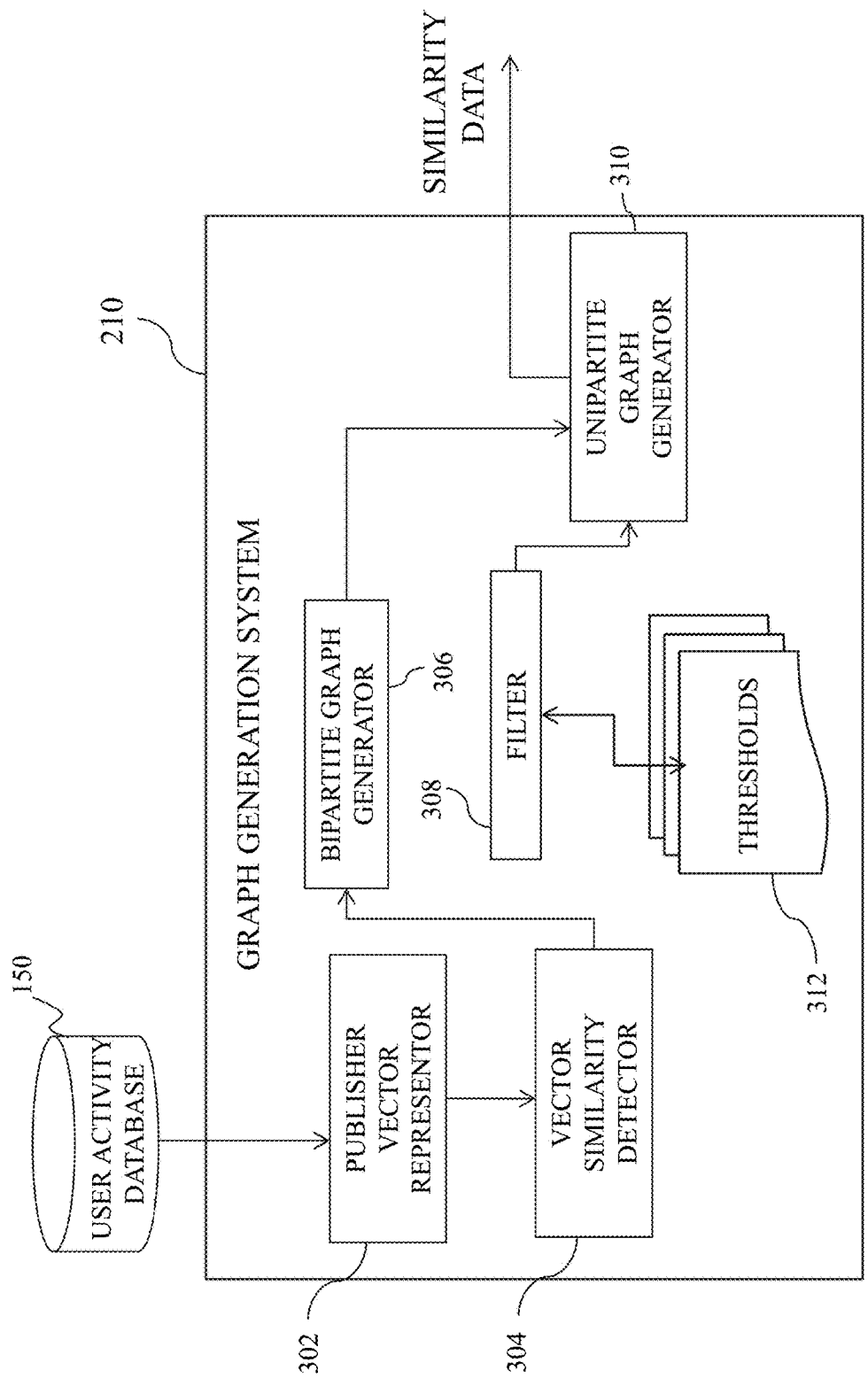
FIG. 3A is an illustrative diagram of an exemplary graph generation system, in accordance with various embodiments of the present teaching.

FIG. 3A is an illustrative diagram of an exemplary graph generation system, in accordance with various embodiments of the present teaching. Graph generation system 210, in the non-limiting embodiment, may include a publisher vector representor 302, a vector similarity detector 304, a bipartite graph generator 306, a filter 308, and a unipartite graph generator 310.

Publisher vector representor 302, in some embodiments, may receive vector data associated with visitors of one or more publisher websites from user activity database 150. Vector data may include features associated with each particular publisher entity. For example, vector data may include IP addresses associated with various publishers, user agent strings associated with various publishers, device identifiers associated with various publishers, and the like.

In one illustrative example, as described in greater detail below with reference to FIG. 4A, vector data 410 may include a first publisher vector associated with a first publisher, which may include four IP addresses—IP1, IP2, IP3, and IP4. Vector data 410 may further include a second publisher vector associated with a second publisher, which may include three IP addresses—IP2, IP3, and IP4. Vector data 410 may still further include a third publisher vector associated with a third publisher, and a fourth publisher vector associated with a fourth publisher, which may include IP addresses IP3, IP4, IP5, and IP5, IP6, respectively.

Vector similarity detector 304 may be configured to determine how similar two or more publisher vectors are to one another. In some embodiments, the similarity between two publishers may be represented by their Jaccard coefficient, which is described below by Equation 1.

$$\text{similarity}(pub_i, pub_j) = \left| \frac{pub_i \cap pub_j}{pub_i \cup pub_j} \right|. \quad \text{Equation 1}$$

Upon receiving the vector data from publisher vector representor 302, vector similarity detector 304 may calculate Jaccard coefficients for each set of publishers (e.g., publisher_i and publisher_j, where i≠j). As an illustrative example, consider vector data 410. Processor(s) 202 of vector similarity detector 304 may determine the following coefficients: Similarity(Publisher_1, Publisher_2)=0.75; Similarity(Publisher_1, Publisher_3)=0.4; Similarity(Publisher_1, Publisher_4)=0; Similarity(Publisher_2, Publisher_3)=0.5; Similarity(Publisher_2, Publisher_4)=0; and Similarity (Publisher_3, Publisher_4)=0.25.

Bipartite graph generator 306 may be configured, in some embodiments, to generate a bipartite graph, or a first representation, reflecting the similarities between the various publishers within the vector data. The bipartite graph, for example, may consider each publisher vector as a node, while the corresponding features represented by that vector as another set of nodes. For example, with reference to vector data 410, the publishers (e.g., Publisher_1, Publisher_2, Publisher_3, and Publisher_4) may be considered a first set of nodes, while the features (e.g., IP_1, IP_2, IP_3, IP_4, IP_5, and IP_6) may be considered a second set of nodes.

Figure 4A:
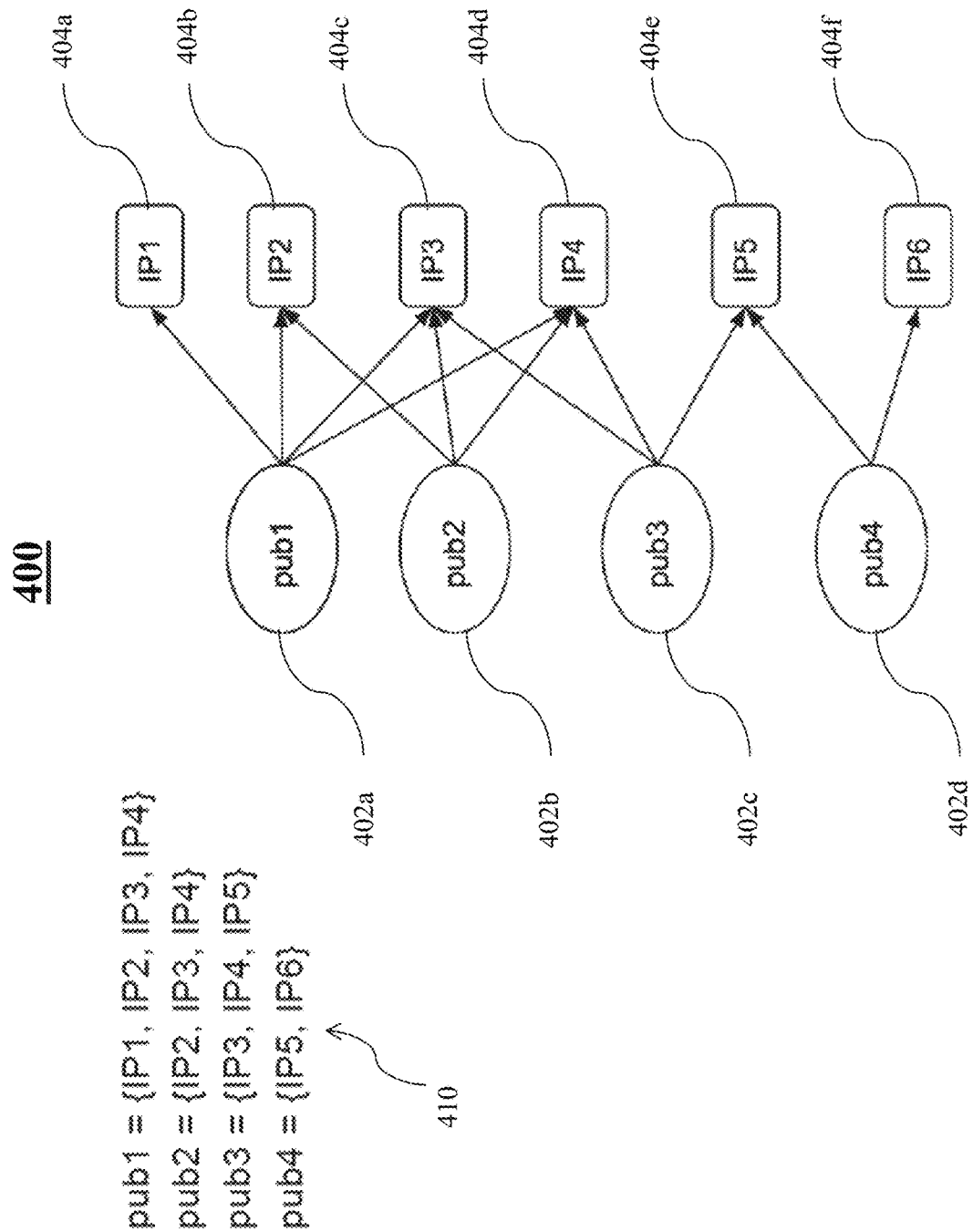
FIG. 4A is an illustrative representation of an exemplary bipartite graph, in accordance with various embodiments of the present teaching.

FIG. 4A is an illustrative representation of an exemplary bipartite graph, in accordance with various embodiments of the present teaching. As seen in FIG. 4A, for vector data 410, graph 400 may be generated by bipartite graph generator 306. In graph 400, first set of nodes 402a-d may be related to second set of nodes 404a-f. In the illustrative embodiment, the Jaccard coefficient for each vector of vector data 410 indicates how similar one publisher is to another publisher, which may be visually represented by graph 400. In some embodiments, however, graph 400 may not be visually rendered, and may instead data representing graph 400 may be generated and stored within memory 204 of graph generation system 210. In this particular scenario, the generated representation may be used for later analysis, as described below.

Unipartite graph generator 310, in some embodiments, may be configured to generate a unipartite graph, or a second representation, based on data associated with the bipartite graph, or first representation, generated by bipartite graph generator 306. In one embodiment, unipartite graph generator 310 may be configured such that graph 400 of FIG. 4A may be converted into a representation where only the entities (e.g., publishers) are present. In this particular scenario, the Jaccard coefficient between two entities (e.g., publishers) reflects the strength of the overlap therebetween. For example, a larger Jaccard coefficient may indicate a greater similarity between two publishers, whereas a smaller Jaccard coefficient may indicate less similarity between two publishers.

Figure 4B:
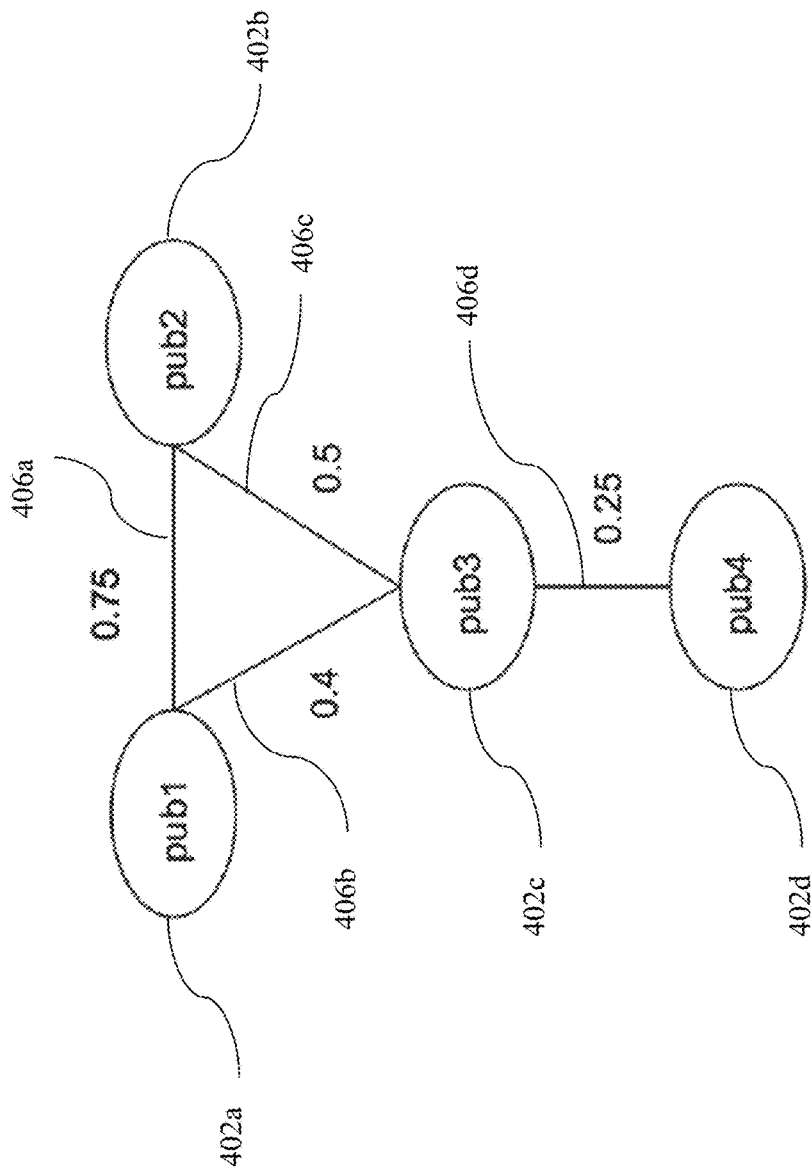
FIG. 4B is an illustrative representation of an unipartite graph, in accordance with various embodiments of the present teaching.

FIG. 4B is an illustrative representation of a unipartite graph, in accordance with various embodiments of the present teaching. As seen in FIG. 4B, unipartite graph 450 may include publisher nodes 402a-d. Each node may be connected to another node by a line, such as lines 406a-d, reflective of the Jaccard coefficient between those two nodes. For example, publisher_1 and publisher_2 may be connected to one another by line 406a, having a value of 0.75. This may correspond to the Jaccard coefficient between publisher_1 and publisher_2, which in the illustrative example has a value of 0.75.

In some embodiments, graph generation system 210 may further include filter 308. Filter 308 may be in communication with unipartite graph generator 310 to reduce an amount of nodes present within the unipartite graph. Filter 308 may reference thresholds 312, which specify a particular threshold value. If a Jaccard coefficient exceeds threshold 312 implemented by filter 308, then unipartite graph generator 310 may keep those nodes. However, if the Jaccard coefficient does not exceed threshold 312, then unipartite graph generator 310 may remove those nodes. This may allow the representation produced by generator 310 to have nodes corresponding to entities whose overlap (e.g., similarity), is above threshold 312.

Implementation of filter 308 may allow the output data from graph generation system 210 to include, in a non-limiting embodiment, only those entities that are deemed to be substantially similar to one another, statistically. Additionally, the implementation of filter 308 may reduce the size of the unipartite graph to a more manageable size. However, persons of ordinary skill in the art will recognize that, in some embodiments, filter 308 may be optional. Additionally, threshold 312 may be configurable by a user, an operator of fraudulent network detection system 140, and/or pre-set.

The output of graph generation system 210 may be similarity data representing how similarity two or more entities are to one another. For instance, data output by system 210 may indicate how similar each publisher under analysis is to one another based on the features associated with those publishers. In some embodiments, the similarity data may be graphical in representation, however alternatively and/or additionally, the similarity data may be capable of being used to represent a graph of the similarity. In the latter case, an additional graph rendering system may be employed to produce the unipartite graph based on the similarity data that is output.

Figure 3B:
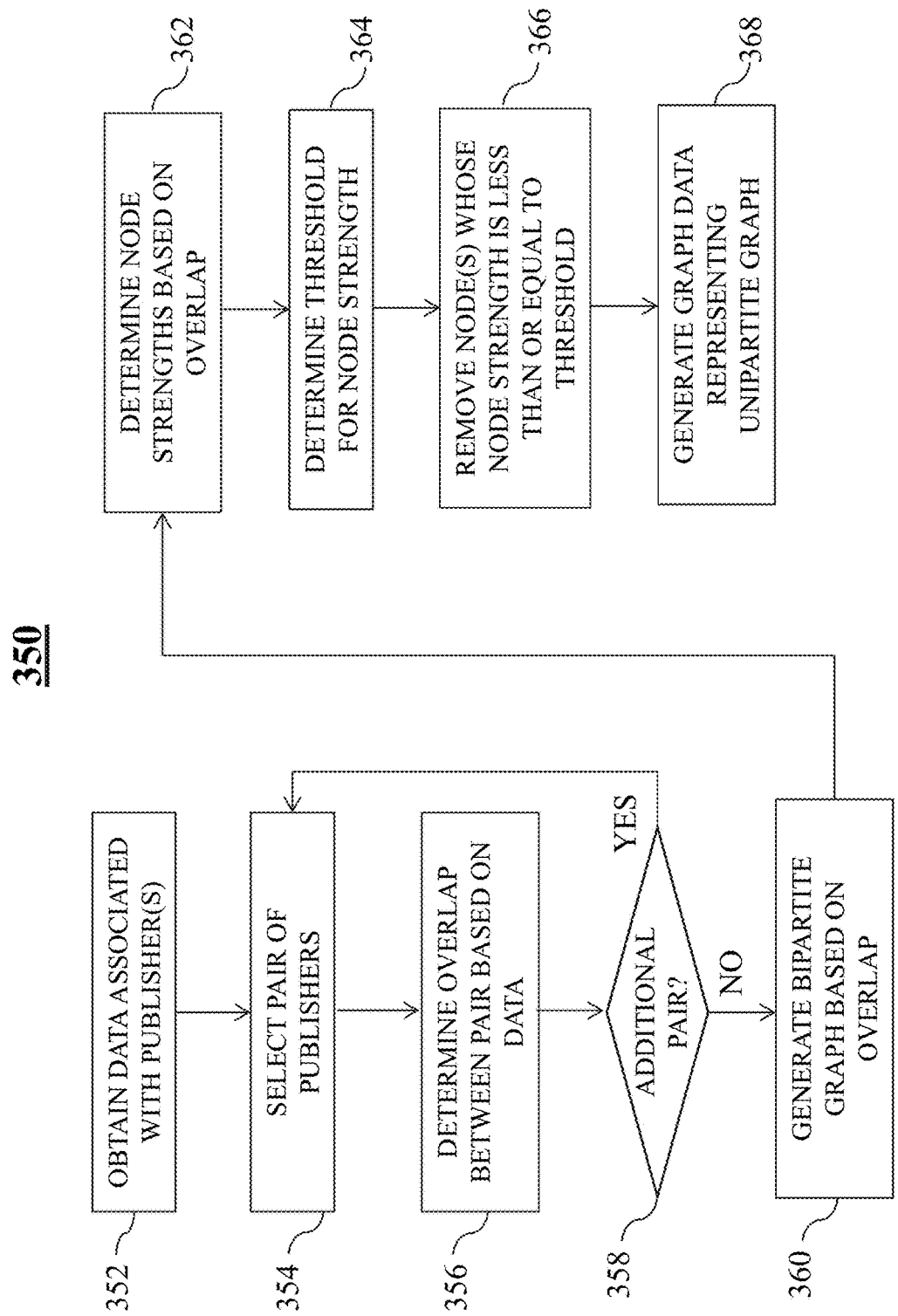
FIG. 3B is an illustrative flowchart of an exemplary process for generating similarity data, in accordance with various embodiments of the present teaching.

FIG. 3B is an illustrative flowchart of an exemplary process for generating similarity data, in accordance with various embodiments of the present teaching. Process 350 may begin at step 352. At step 352, data associated with one or more publishers may be obtained. For example, vector data 410 representing publisher vectors may be obtained by publisher vector representor 302. In some embodiments, publisher vector representor 302 may generator the vector data. Additionally or alternatively, publisher vector representor 302 may receive the vector data from databases 150 and/or 170.

At step 354, a pair of publishers from the publisher included within the data obtained may be selected. At step 356, an overlap between the pair may be determined based on the data. In on embodiment, vector similarity detector 304 may determine the overlap between the pair. For example, using vector data 410, a Jaccard coefficient, representing how similar two publishers are within the vector data, may be determined. At step 358, a determination may be made as to whether or not there are any other additional pairs of publishers available to be analyzed. For example, vector data 410 includes four publisher vectors associated with four publishers. This means that there are six possible pairs of publishers available to be analyzed. If not all of the six publisher pairs have been analyzed, then, process 350 may return to step 354, where a different pair of publishers may be selected. However, if at step 358 it is determined that all of the available publisher pairs have been analyzed, then process 350 may proceed to step 360.

At step 360, a bipartite graph may be generated based on the overlap determined for each pair of publishers. At step 362, node strengths may be determined based on the determined overlap between two or more publishers. For instance, based on the Jaccard coefficients determined for each publisher pair from vector data 410, graph 400 may be generated by bipartite graph generator 306. Further, the Jaccard coefficient may reflect a strength of the overlap between pairs of publishers. In other words, the Jaccard coefficient between two publishers may reflect how similar the features of those publishers are.

At step 364, a threshold for node strength may be determined. For instance, filter 308 may select threshold 312, which may be used for reducing a number of publishers to be included for fraudulent network analysis. At step 366, one or more nodes whose node strength is less than, or equal to, the threshold, may be removed from consideration. At step 368, graph data representing a unipartite graph may be generated by unipartite graph generator 310. In some embodiments, the graph data may be generated and then the filtering (e.g., application of the threshold) may occur. Therefore, persons of ordinary skill in the art will recognize that the ordering of process 350 is illustrative, and additional arrangements are also possible.

Figure 5A:
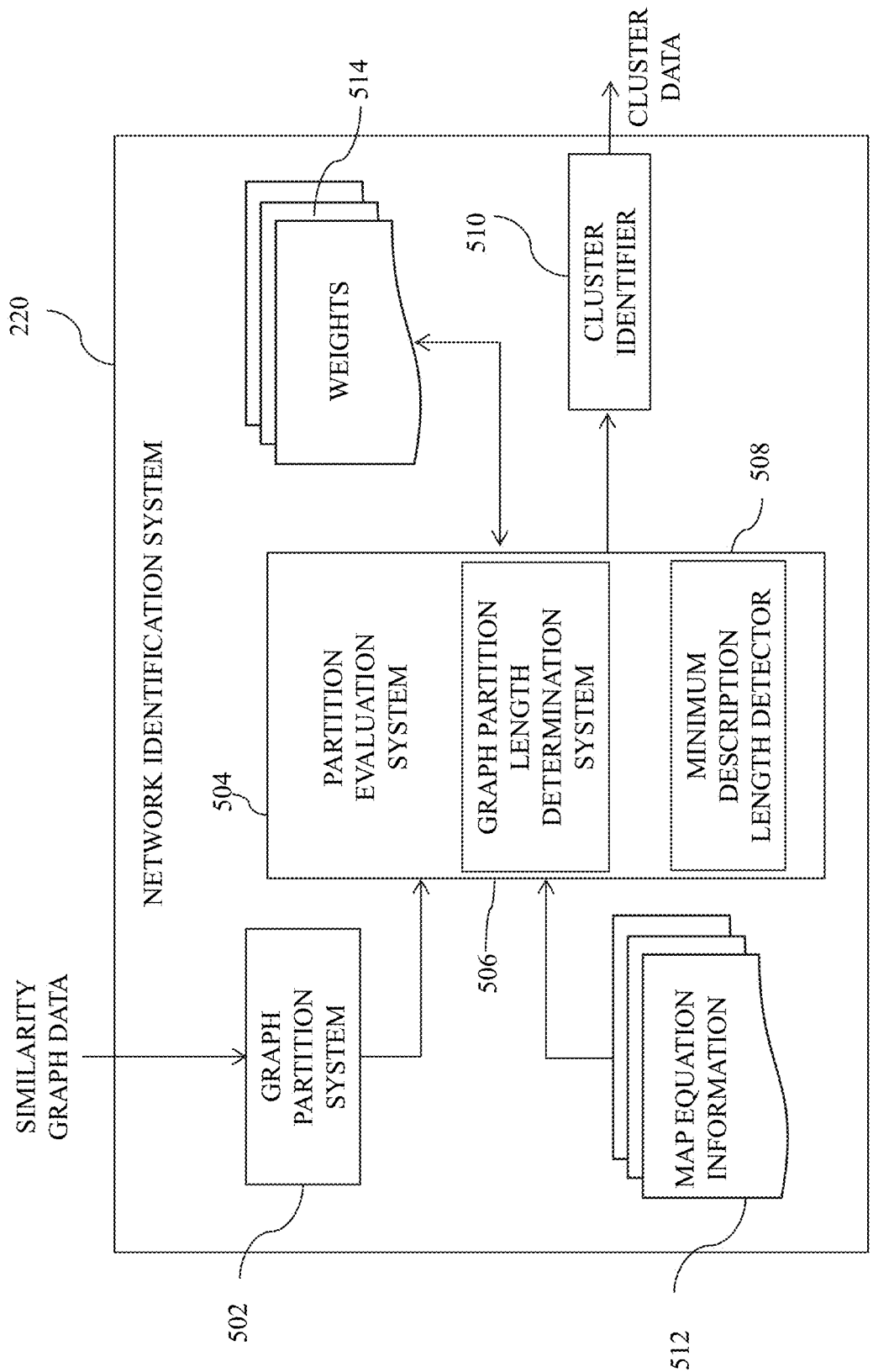
FIG. 5A is an illustrative diagram of an exemplary network identification system, in accordance with various embodiments of the present teaching.

FIG. 5A is an illustrative diagram of an exemplary network identification system, in accordance with various embodiments of the present teaching. Network identification system 220 of FIG. 5A may include, in a non-limiting embodiment, a graph partition system 502, a partition evaluation system 504, and a cluster identifier 510. Partition evaluation system 504, for instance, may further include a graph partition length determination system 506 and a minimum description length detector 508. In some embodiments, each of graph partition system 504, partition evaluation system 504, and cluster identifier 510 may include one or more processors, memory, and communications circuitry, such as processor(s) 202, memory 204, and communications circuitry 206.

Graph partition system 502 may be configured to receive the similarity data output by graph generation system 210, and identify one or more partitions within the data. For instance, graph partition system 502 may segment the graph, or the output data representing the graph, into one or more graph partitions to be analyzed. Graph partition system 502 may therefore generate graph partition data reflective of graph partitions identified within the similarity graph data received by network identification system 220.

To generate/identify graph partitions, a recursive search procedure may, in some embodiments, be employed. For instance, neighboring nodes may be joined, or clustered, into modules. These modules may subsequently be joined into larger modules, and then these larger modules joined again into even larger modules, and so on. In a random sequential order, each node may be moved to a neighboring module, and a determination may be made as to whether decrease in description length occurs. Each node may be moved into neighboring modules such that a largest decrease in the description length L(G) results. If, however, no movement of a node or nodes results in a description length L(G) decrease, then the node will be left to its original module.

This technique may be repeated, where each iteration corresponds to a new random sequential ordering of node movement. The iterations repeat until the movement of nodes ceases to generate a decrease in the description length L(G). The rebuilt network may now include the modules of the previous level forming the nodes at the current level. Similarly, now, these nodes may be joined together into modules. Therefore, the hierarchical rebuilding of the network of nodes may be repeated until the map equation cannot be reduced any further.

Partition evaluation system 504 may receive the graph partition data and evaluate each partition. For instance, the graph partition data, generated by graph partition system 502 based on the data output from graph generation system 210, may be used to identify networks by network identification system 220. Partition evaluation system 504 may employ map equation information 512 to evaluate the one or more graph partitions.

Map equation information 512 may include, for example, one or more equations, formulas, algorithms, and the like, which may be used to evaluate a graph partition. In a non-limiting embodiment, map equation information 512 may include a community detection technique, which may be employed to identify the networks. The community detection technique may determine, for example, a path that a random walker takes as to travels from node to node, where the pathways for traveling correspond to the connections between each node. In the example, a node may correspond to one point on the graph whose partition is being analyzed. For example, publisher nodes 402a-d of FIG. 4B may correspond to such nodes. The connections specified by two nodes may correspond to the Jaccard coefficient therebetween. Thus, nodes that are commonly visited may be identified, and nodes that are infrequently visited may also be identified.

Partition evaluation system 504 may be configured to evaluate each graph partition using graph partition length determination system 506. Graph partition length determination system 506, in one embodiment, may be configured to determine a graph partition length for the particular graph partition being evaluated. In some embodiments, a quality function, which may also be referred to herein interchangeably as a cost function or map equation, used to evaluate a particular partition may correspond to the minimum description length ("MDL") principle. For example, graph partition length determination system 506 may access map equation information 512 to determine a quality function to employ for the determining the length of a particular graph partition, such as by employing the MDL principle. The MDL principle reflects that regularity in data may be employed to compress a length of that data. The graph partition that provides the MDL for a path may indicate the community structure.

For a graph partition G of n nodes into m communities, the quality function may be described by Equation 2:

$$L(G) = q_{exit} H(Q) + \Sigma_{i=1}^{m} p_{within}^{i} H(P^i) \quad \text{Equation 2.}$$

In Equation 2, $q_{exit} = \Sigma_{i=1}^{m} q_{exit}^{i}$ is the total probability for a random walker to exit any of the m communities present in the graph, and $q_{exit}^i$ corresponds to the probability that the random walker exits the i-th community. Furthermore, in Equation 2, $P_{within}^i = \Sigma_{\alpha \in i} P_\alpha + q_{exit}^i$ correspond to the total probability that any node in the i-th community is visited combined with the probability that the random walker exits the i-th community.

In Equation 2, the entropy of movements between terms is represented by H(Q):

$$H(Q) = -\sum_{i=1}^{m} \frac{q_{exit}^i}{q_{exit}} \log\left(\frac{q_{exit}^i}{q_{exit}}\right). \quad \text{Equation 3}$$

Further still, $H(P^i)$ corresponds to the entropy of movements within the i-th community.

$$H(P^i) = -\frac{q_{exit}^i}{q_{exit}^i + \Sigma_{\beta \in i} p_\beta} \log\left(\frac{q_{exit}^i}{q_{exit}^i + \Sigma_{\beta \in i} p_\beta}\right) - \quad \text{Equation 4}$$

$$\Sigma_{\alpha \in i} \frac{p_\alpha}{q_{exit}^i + \Sigma_{\beta \in i} p_\beta} \log\left(\frac{p_\alpha}{q_{exit}^i + \Sigma_{\beta \in i} p_\beta}\right).$$

Substituting Equations 3 and 4 into Equation 2 therefore yields:

$L(G) = \Sigma_{i=1}^{m} q_{exit}^i \log(\Sigma_{i=1}^{m} q_{exit}^i) - 2 \Sigma_{i=1}^{m} q_{exit}^i \log$
$(q_{exit}^i) - \Sigma_{\alpha=1}^{n} p_\alpha \log(p_\alpha) + \Sigma_{\alpha \in i} p_\alpha) \log(q_{exit}^i +$
$\Sigma_{\alpha \in i} p_\alpha)$ Equation 5.

Minimum description length detector 508 may, in some embodiments, be configured to determine a minimized description length L(G), as described by Equation 5, given all possible graph partitions G, for each graph partition length determined by graph partition length determination system 506. Therefore, the graph partition that provides a "shortest" description length may reflect an optimal community structure for the graph (e.g., unipartite graph). In some embodiments, a node's visit probability, $p_\alpha$, and the node's exit probability, $q_{exit}^i$, may be determined using a page rank technique. A page rank, for example, may correspond to a rank of a particular webpage (associated with a node) based on that site's search engine results. Generally speaking, the page rank technique may correspond to one form of a power iteration technique.

In one embodiment, weights 514 may be employed for each node. For example, weights 514 may rank each node and assign a weight to that node based on its rank. Directed weighted graphs, for instance, may correspond to those graphs described above. For undirected weighted graphs, however, the node's visit probability may correspond to a relative weight of the links connected to that node, which may be calculated as the total weight of the links to the node divided by twice the total weight of all the node links in the graph. The exit probability $q_{exit}^i$ therefore may correspond to the relative weight of the i-th community calculated as the total weight of the links to the i-th community divided by twice the total weight of all the community links in the graph. In one example embodiment, the publisher graph may correspond to an undirected weighted graph where each publisher (e.g., entity) corresponds to node in the graph and the link between two publishes corresponds to the Jaccard coefficient.

Based on the MDL determined by minimum description length detector 504, cluster identifier 510 may generate cluster data. The cluster data may indicate a number of clusters of nodes identified within a particular graph. For each cluster, the cluster data may include, amongst other information, a number of publishers included within that cluster, a number of websites associated with those publishers, a number of page sections included within those websites, and a fraud score associated with that cluster. Typically, a small number, if any, of the clusters may represent fraudulent activity. The fraud score, as described in greater detail below, may indicate a probability (e.g., a likelihood) that a particular cluster identified within the cluster data is fraudulent. Therefore, network identification system 220 may generate cluster data, which may reflect possible fraud networks, and may provide the cluster data to network scoring system 230 for further analysis.

Figure 5B:
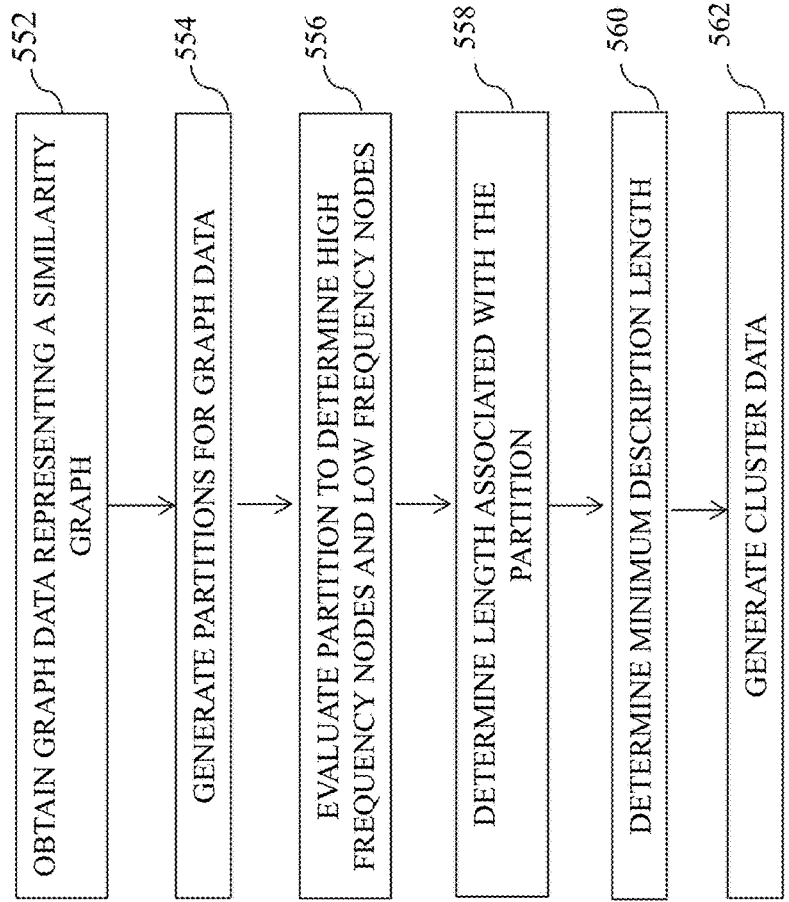
FIG. 5B is an illustrative flowchart of an exemplary process for determining a number of clusters within a graph, in accordance with various embodiments of the present teaching.

FIG. 5B is an illustrative flowchart of an exemplary process for determining a number of clusters within a graph, in accordance with various embodiments of the present teaching. Process 550 may, in a non-limiting embodiment, begin at step 552. At step 552, graph data representing a similarity graph may be obtained. For example, graph data (e.g., similarity graph data) may be obtained by network identification system 220 from graph generation system 210. At step 554, graph partitions may be generated for the received graph data. For example, graph partition system 502 may receive the graph data and may generate one or more graph partitions, and/or identify one or more graph partitions within the graph data.

At step 556, each partition may be evaluated to determine high frequency nodes and low frequency nodes. For example, partition evaluation system 504 may determine which nodes of a particular graph partition are frequently visited, and which nodes are infrequently visited. At step 558, a description length associated with each partition may be determined. For example, graph description length determination system 506 may determine a description length for a partition. At step 560, a minimum description length may be determined. For example, minimum description length detector 508 may determine a minimum description length using Equation 5. In some embodiments, one or more weights 514 may be employed by minimum description length detector 508 to determine the minimum description length. At step 562, cluster data may be generated. For instance, cluster identifier 510 may generate the cluster data. In some embodiments, the cluster data may indicate a number of clusters within each partition.

Figure 6A:
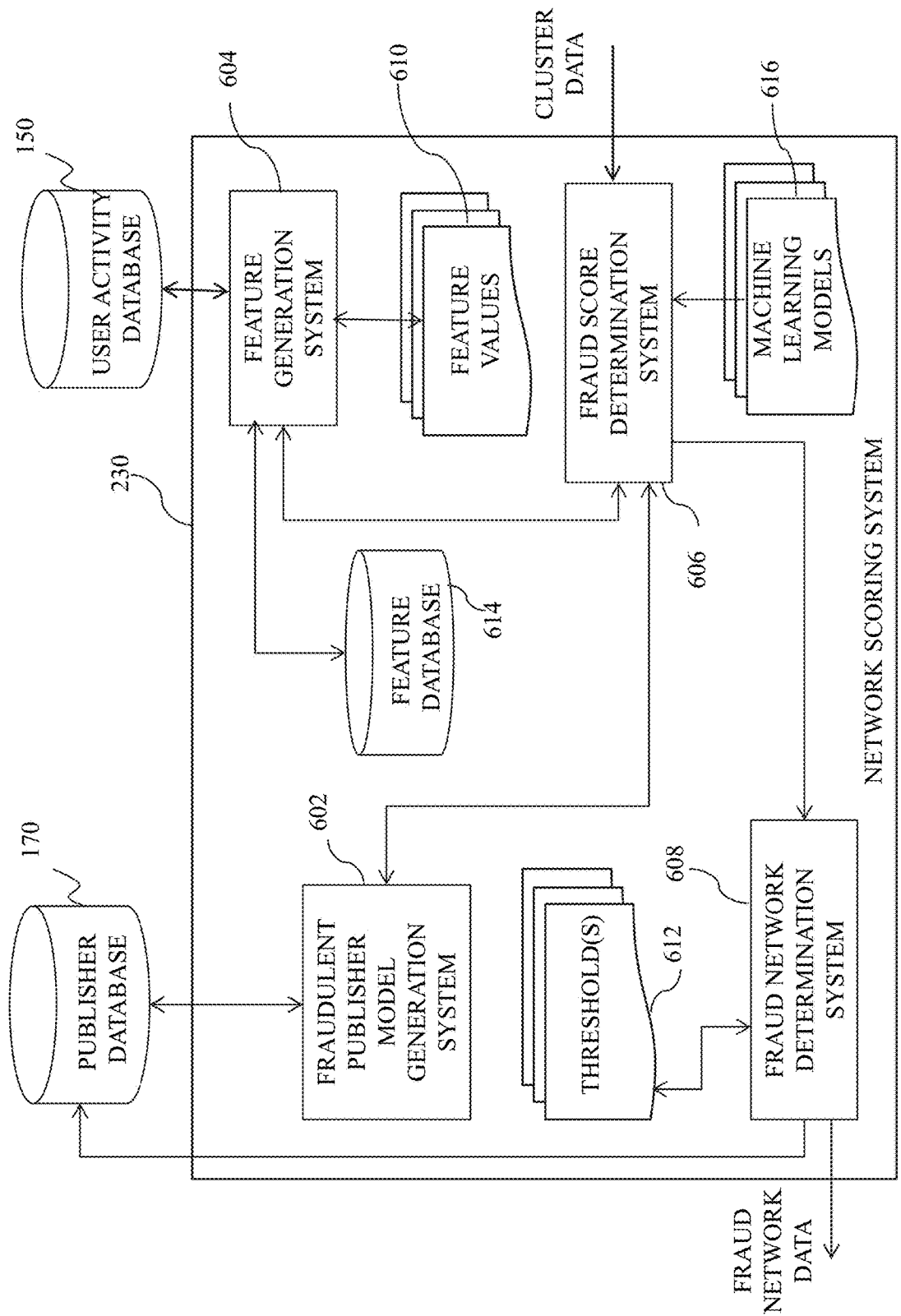
FIG. 6A is an illustrative diagram of an exemplary network scoring system, in accordance with various embodiments of the present teaching.

FIG. 6A is an illustrative diagram of an exemplary network scoring system, in accordance with various embodiments of the present teaching. Network scoring system 230 may include, amongst other features, a fraudulent publisher model generation system 602, a feature generation system 604, a fraud score determination system 606, a fraud network determination system 608, and a feature database 614. In some embodiments, each of fraudulent publisher model generation system 602, feature generation system 604, fraud score determination system 606, and fraud network determination system 608 may include one or more processors, memory, and communications circuitry, such as processor(s) 202, memory 204, and communications circuitry 206.

Fraudulent publisher model generation system 602 may be configured to identify fraudulent publishers, flag those identified fraudulent publishers, and store the flagged fraudulent publishers within publisher database 170. Each publisher (e.g., publisher(s) 130 of FIGS. 1A and 1B), may be analyzed by fraudulent network detection system 140. For instance, in some embodiments, data associated with each publisher may be tracked and stored within publisher database 170. For example, the data that is stored may include, but is not limited to, publisher identification/identifier information, publisher naming information, publisher location information (e.g., physical location), publisher site identification information, page section identification for each publisher site, and a status code associated with the publisher. The status code may correspond to metadata reflective of whether that particular publisher is indicated as being fraudulent or non-fraudulent. For example, a logical 1/0 (e.g., TRUE/FALSE) may be attributed to each publisher ID, which may indicate whether that particular publisher has been labeled as being a fraudulent publisher or a non-fraudulent publisher. In some embodiments, publisher IDs that have been assigned the fraudulent publisher label may be suppressed so as to not allow those publishers from being served with any advertisements and/or impressions. In some embodiments, a publisher ID that has been assigned the fraudulent publisher label (e.g., metadata indicating fraudulency) may be removed from the access altogether so as to terminate that publisher's existence within the system.

Fraudulent publisher model generation system 602 may, upon receiving a request for publisher data from fraud score determination system 606, obtain publisher information from publisher database 170. In some embodiments, all page section identifiers associated with publishers may be provided to fraud score determination system 606 for use in generating/refining one or more machine learning models 616. For example, page section IDs associated with fraudulent publishers, as indicated by metadata associated with those publishers stored within publisher database 170, may be used as positive labels for machine learning models 616, and page section IDs associated with non-fraudulent publishers may be used as negative labels for machine learning models 616. This information may be combined with feature data associated with page sections to determine fields to be used for determining the fraud score for a particular publisher.

Feature generation system 604 may, in one embodiment, be configured to generate/identify one or more features to be employed by fraud score determination system for generation fraud scores for a particular network/cluster. Features may, as described herein, correspond to any characteristic associated with a user's behavior with a particular website, or page section of a website, which may reflect how a user interacts with that site. Feature generation system 604 may reference feature values 610 as a basis for the various features to extract from user activity database 160. For example, click data associated with a particular site, dwell time, user identifiers, device identifiers, browser cookies, user agent strings, IP addresses, and the like, may correspond to various types of feature values 610, which may be extracted from user activity database 150 for users accessing one or more sites (e.g., publisher(s) 130).

In some embodiments, feature generation system 604 may be configured to generate features to be used for scoring publisher page sections. These features may be generated, for example, at the page section level. In some embodiments, certain feature values may be weighted higher for use than other features to remove biases that may inherently be associated with those page sections. For example, number of clicks may be weighted lower than other feature values as the number of clicks may be biased towards page sections with large or small traffic volumes. Feature generation system 604, therefore, may generate features that are independent of page section characteristics. For example, a percentage of clicks from a mobile device in a page section may correspond to one type of feature generated by feature generation system 604.

Various sets of features may be generated by feature generation system. As a non-limiting example, sets of features may include average number of clicks features from an entity—such as average number of clicks from a particular browser cookie, traffic coordinate features—such as percentage of clicks from hosting IP addresses, time-to-click ("TTC") data—such a data measuring deviation between a current page section TTC distribution and a baseline TTC distribution, entity concentration features—such as a ration of IP addresses to user agent strings, activeness features—such as a number of times that a page section is active during 24 one-hour intervals, server-click entity mismatch features—such as a percentage of mismatch between a server IP address and a user IP address, cookie life features—such as an average cookie age (e.g., browser cookie age), and impression related features—such as click-through-rate ("CTR"), which may be calculated as a number of clicks divided by a number of impressions. In this particular example, the average number of clicks features corresponds to 19 features, the traffic coordinate features corresponds to 8 features, the TTC data corresponds to 8 features, the entity concentration features corresponds to 6 features, the activeness features corresponds to 4 features, the server-click entity mismatch features corresponds to 6 features, the cookie life features corresponds to 2 features, and the impression related features corresponds to 2 features. Thus, in total, 55 total features may be generated and made available for fraud score determination system 606 by feature generation system 604. Each of the features may be stored within feature database 614. Therefore, upon receiving cluster data from network identification system 220, and/or publisher data from fraudulent publisher model generation system 602, feature generation system 604 may access features stored within feature database, and their corresponding data, and provide those to fraud score determination system. However, persons of ordinary skill in the art will recognize that additional features may be employed and/or generated, and those features may be provided to fraud score determination system 606 in response to any request, or any indication to do so, and the aforementioned is merely exemplary.

Fraud score determination system 606 may, in some embodiments, be configured to determine a fraud score for a particular network/cluster based, at least in part, on publisher data received from fraudulent publisher model generation system 602 and feature data received from feature generation system 604. For instance, in response to receipt of cluster data from network identification system 220, fraud score determination system 606 may request, or otherwise obtain, the publisher data and the feature data to be used for generating a fraud score for each cluster identified within the cluster data.

In some embodiments, fraud score determination system 606 may employ machine learning models 616 as a mechanism to formulate and/or refine one or more models for generating fraud scores. For example, training data for a given temporal duration (e.g., three months of data) may be used to train a fraud score model. In some embodiments a logistic regression ("LR") model may be employed, while in other embodiments a gradient boosting machine ("GBM") model may be employed. In some embodiments, fraud score determination system 606 may use machine learning models 616 to generate a fraud score for each cluster from the cluster data, and may output fraud score/cluster data representing each cluster and its corresponding fraud score. As the fraud score is based on features generated from multiple publishers/entities and encompasses information regarding user interactions with these features through a non-linear model (e.g., a GBM model), the fraud score may be very valuable in identifying whether a particular cluster is indicative of a fraud network.

As an illustrative example, model(s) 616 used to determine the fraud score may be represented by Equation 6:

$$y = f(x_1, x_2, \ldots, x_m) \quad \text{Equation 6.}$$

In Equation 6, y may correspond to a label—such as a label stored within publisher database 170—that indicates whether a publisher is a fraudulent publisher or a non-fraudulent publisher (e.g., logical 1/0). Furthermore, $x_1$, $x_2, \ldots, x_m$ may correspond to features, where f is the model to be used (e.g., a GBM model). The labels may be obtained from publisher database 170, and the features may be generated on any temporal basis. For example, the features may be generated, or re-calculated, hourly, daily, weekly, etc. Machine learning model(s) 616 are then trained using this data, and a fraud score for each publisher within the cluster is generated. The aggregate of the fraud scores for each cluster's publishers may yield the overall cluster's fraud score.

Fraud network determination system 608 may be configured to receive the fraud score data from fraud score determination system 606 and determine whether or not the fraud score(s) for a particular cluster or clusters are likely indicative of fraudulent behavior. In some embodiments, fraud network determination system 608 may employ thresholds 612, which may be pre-set and/or dynamically configurable, to retain fraud score/cluster data for those clusters whose fraud score equals or exceeds threshold 612. For example, threshold(s) 612 may correspond to a numerical value, and fraud scores that equal or exceed the numerical value may be retained by fraud network determination system 608 as being indicative of likely being fraud networks. In some embodiments, fraud network determination system 608 may output fraud network data, which may include cluster data and fraud score data associated with those clusters whose fraud score equals or exceeds threshold 612. In some embodiments, threshold 612 may be adjusted to increase or limit the number of clusters included within the fraud network data. For example, if threshold 612 is low, the number of clusters included within fraud network data may be great, and therefore fraud network determination system 608 may increase threshold 612. In some embodiments, threshold(s) 612 may include a second threshold that may be used to identify whether the amount of fraud networks identified within the fraud network data is too great such that the first threshold 612 is to be readjusted. For example, if the number of clusters included within the fraud network data is greater than the second threshold, then fraud network determination system 608 may determine that first threshold is needs to be modified. Fraud network determination system 608 may therefore modify the first threshold and regenerate the fraud network data until the number of clusters included within the fraud network data does not equal or exceed the second threshold.

In some embodiments, the fraud network data may be stored by publisher database 170. For instance, for each publisher ID, a flag may be generated indicating whether that publisher is identified by fraud network determination system 608 as likely being a fraud network, or part of a fraud network. For example, if publisher A is part of cluster B, having a fraud score S, which is greater than threshold T, then publisher A may have a flag generated by fraud network determination system 608 that indicates that publisher A is likely part of a fraudulent network. Thus, publisher A's ID may have a logical 1 stored therewith within publisher database 170.

Figure 6B:
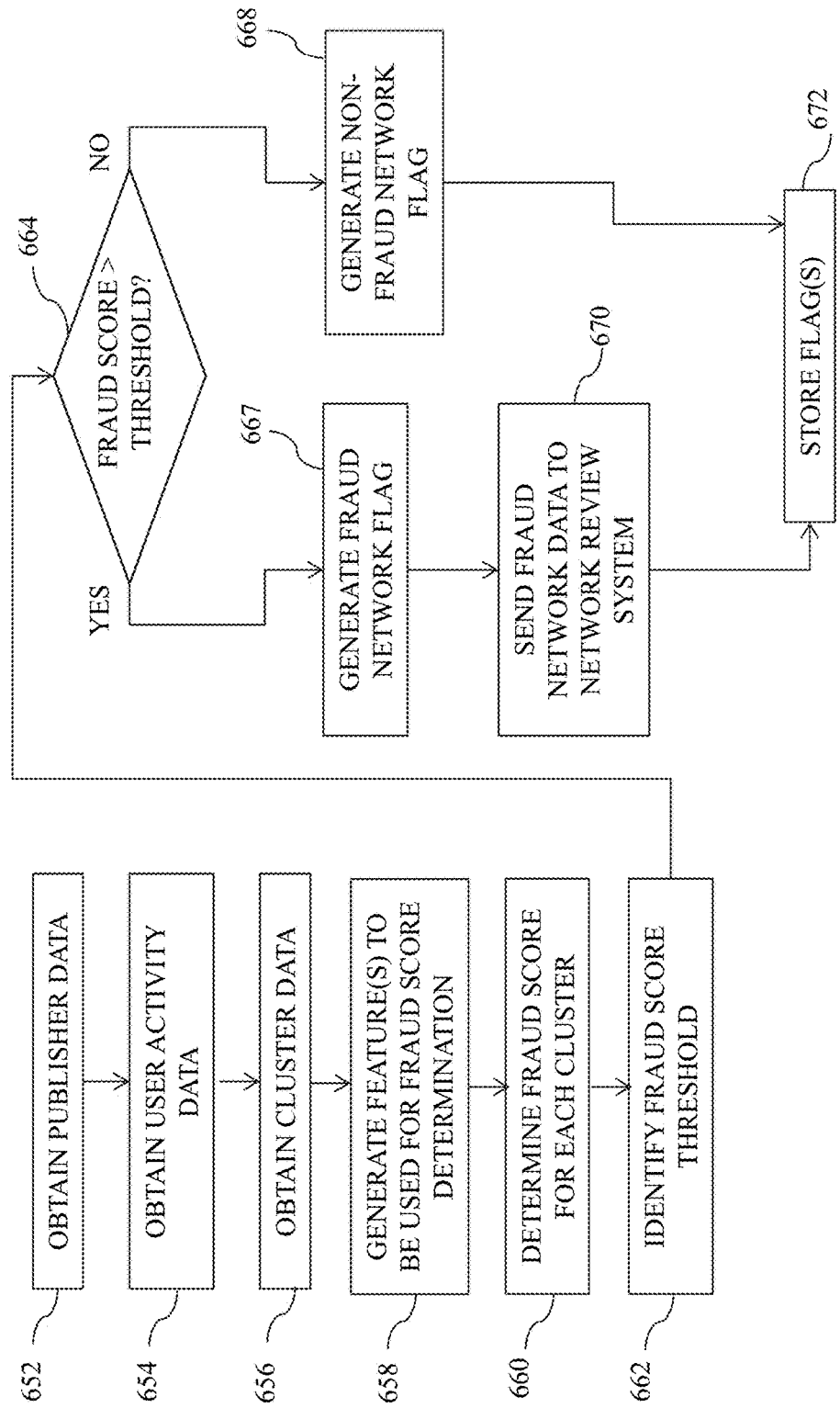
FIG. 6B is an illustrative flowchart of an exemplary process for determining one or more likely fraud networks within cluster of publishers, in accordance with various embodiments of the present teachings.

FIG. 6B is an illustrative flowchart of an exemplary process for determining one or more likely fraud networks within cluster of publishers, in accordance with various embodiments of the present teachings. Process 650 may begin, in one embodiment, at step 652. At step 652, publisher data may be obtained. For example, publisher data may be obtained from publisher database 170 by fraudulent publisher model generation system 602. In some embodiments, the publisher data may indicate, amongst other aspects, publisher IDs and metadata associated with those publisher IDs, such as metadata indicating whether a particular publisher corresponds to a fraudulent publisher or a non-fraudulent publisher.

At step 654, user activity data may be obtained. For example, user activity data may be obtained from user activity database 150. In some embodiments, the user activity data may indicate user interactions with various aspects of publisher sites. For example, section clicks, CTRs, and the like, may be reflected by the user activity data. At step 656, cluster data may be obtained. For instance, cluster data may be received by network scoring system 230 from network identification system 220.

At step 658, feature(s) to be used for fraud score determination may be generated. For instance, based on feature values 610 identified within the user activity data, feature generation system 604 may generate one or more features to use for determining a fraud score for a cluster. In some embodiments, the feature(s) may be stored within feature database 614. In other embodiments, some or all of the feature(s) used to determine the fraud score may be obtained from feature database 614, while the remaining, if any, feature(s) may be generated by feature generation system 604.

At step 660, a fraud score for each cluster may be determined. For instance, using machine learning models 616, such as, and without limitation, a GBM model, a fraud score may be determined for each cluster included within the cluster data. Fraud score data may be generated by fraud score determination system 606, and provided to fraud network determination system 608. At step 662, fraud score threshold(s) may be identified. For example, fraud network determination 608 may identify one or more fraud score thresholds 612 to use for identifying which clusters/publishers are likely fraudulent within the fraud score data. Persons of ordinary skill in the art will recognize that the ordering of one or more of steps 652-662 may be modified, and the order described above is merely exemplary.

At step 664, a determination may be made as to whether or not the fraud score for a particular cluster is greater than (or equal to) the threshold. If, at step 664, the fraud score for a particular cluster is determined to be greater than the threshold, the process 650 may proceed to step 667. At step 667, a fraud network flag may be generated. The fraud network flag may correspond to metadata attributed to a particular publisher ID and/or each publisher ID within a cluster that indicates that the particular publisher is likely a fraudulent publisher and/or part of a fraudulent network. At step 670, the fraud network data may then be sent to a network review system. For example, fraud network data representing publisher identifiers and metadata indicating that the corresponding publishers are likely part of a fraudulent network may be sent to network review system 240. At step 672, the flag(s) may be stored. For example, the metadata indicating that a particular publisher is part of a fraudulent network may be stored within publisher database 170.

If, however, at step 664, it is determined that the fraud score for a particular cluster is less than the threshold, then process 650 may proceed to step 668. At step 668, a non-fraud network flag may be generated. For example, metadata indicating that a particular publisher identifier is not associated with a fraudulent network (e.g., a logical 0) may be generated and attributed to that publisher. At step 672, the flag(s) may then be stored. For example, the flags indicating that the publisher(s) are not part of a fraudulent network may further be stored within publisher database 170.

Figure 7A:
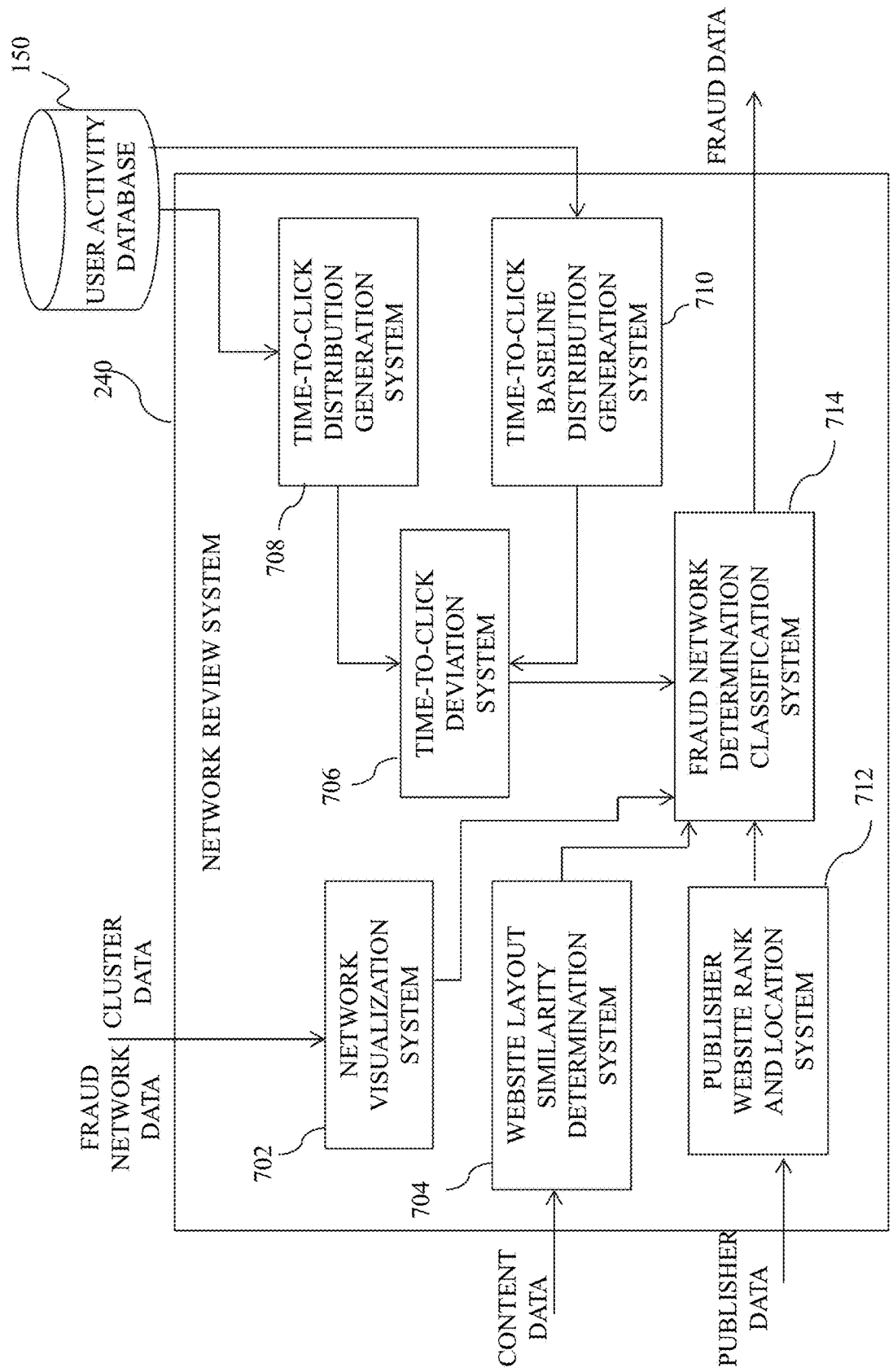
FIG. 7A is an illustrative diagram of an exemplary network review system, in accordance with various embodiments of the present teaching.

FIG. 7A is an illustrative diagram of an exemplary network review system, in accordance with various embodiments of the present teaching. Network review system 240 may include, amongst other components, a network visualization system 702, a website layout similarity determination system 704, a time-to-click ("TTC") deviation system, a time-to-click ("TTC") distribution generation system 708, a time-to-click baseline distribution generation system 710, a publisher website rank and location system 712, and a fraud network determination classification system 714. In some embodiments, each of network visualization system 702, website layout similarity determination system 704, TTC deviation system, TTC distribution generation system 708, TTC baseline distribution generation system 710, publisher website rank and location system 712, and fraud network determination classification system 714 may include one or more processors, memory, and communications circuitry, such as processor(s) 202, memory 204, and communications circuitry 206.

Before suspending the activity of a publisher, in some embodiments, more detailed review of those publishers may be needed. Thus, network review system 240 may receive the fraud network data from network scoring system 230 to determine whether the clusters identified as likely being fraudulent are, in fact, fraudulent, or exhibiting fraudulent behavior.

Network visualization system 702 may be configured to generate one or more visualizations to indicate, visually, how a particular publisher website may be interacted with. For example, network visualization system 702 may generate graphs (e.g., bipartite, unipartite, etc.) based on user activity data with a particular website. In some embodiments, network visualization system 702 may generate a visualization representing interactions based on browser cookie data, IP address data, user agent string data, device ID data, and the like. In some embodiments, network visualization system 702 may indicate the strengths of connections between two or more publishers. For example, network visualization system 702 may generate data indicating a relationship between a first publisher site and one or more additional publisher sites connected thereto, along with each pairs shared IP addresses, IP data associated with each site of the pair, and the Jaccard coefficient therebetween.

Website layout similarity determination system 704 may be configured to obtain content data representing content rendered by a particular website, and determine how similar the content is between two or more websites. For example, if multiple websites all within one cluster of publishers have websites that look substantially similar to one another, then this may indicate likely fraudulent behavior, as a fraudster has just reproduced the general format of a site between other fraud sites, minimally changing the content included therein. Website layout similarity determination system 704 may obtain content data, which may include pixel data, item data, page layout data, color data, hyperlink data, and/or any other data associated with the sites. Web site layout similarity determination system 704 may then be configured to determine how similar the data from one site is to another site. For example, pixel data from one site may indicate the placement of certain colors and shapes within a site. The pixel data from the one site may be compared with the pixel data from another site, and if the difference between the pixel data is less than a threshold, this may indicate substantially similar visual setups between the two sites.

TTC deviation system 706 may be configured to determine deviations between TTC click data and baseline TTC data. TTC data may correspond to an amount of time between when content (e.g., an image, video, text, etc.) is rendered to a visitor of a site, and when that content is interacted with. For example, TTC data may reflect an amount of time between when a user is presented with an advertisement on their user device and when the user clicks on that advertisement. To determine the deviation, TTC deviation system 706 may obtain a TTC distribution from TTC distribution generation system, and a baseline TTC distribution from TTC baseline distribution generation system 710. For a candidate fraud network (e.g., a fraud network included within fraud network data output by network scoring system 230), first TTC data representing a first TTC curve may be generated using TTC distribution generation system 708 based on user activity data obtained from user activity database 150. TTC baseline distribution system 710 may further employ user data from user activity database 150 to generate second TTC data representing a second TTC curve (e.g., a baseline TTC curve), representative of the whole user activity populations TTC activity.

TTC deviation system 706 may then be configured to determine deviations between the TTC data of the network under review as compared to the baseline TTC data. Large discrepancies between the two instances of TTC data may reflect user activity abnormality, which may reflect fraudulent activity. In some embodiments, to produce a TTC curve, a log-transformation may be applied to TTC values to distribute the TTC data, which may then be distributed into a number of data buckets. The baseline TTC curve, for example, may follow a generally Gaussian distribution. Therefore, spikes or other abnormal peaks/valleys within the reviewed network's TTC curve may indicate abnormal TTC behavior.

Publisher website rank and location system 712 may be configured to determine a publisher's website rank in comparison to other sites globally and/or locally. Typically, for example, web sites of publishers within a fraud network may have a very low rank, or no data to be ranked. In some embodiments, an Alexa rank may be used to rank a candidate fraud network's site globally and/or locally. The locations of these websites may also be identified by publisher rank and location system 712. For example, system 712 may be configured to ping each website to identify ping commands of the websites. The ping commands may indicate IP addresses of each site, which may be used to identify the internet service provider associated with those sites, and thus locations from where those sites are located.

Each of network visualization system 702, website layout similarity determination system 704, TTC deviation system 706, and publisher website rank and location system 712 may provide data to fraud network determination classification system 714 to classify a particular network, or publisher within a network, as being fraudulent. As an illustrative example, the data from network visualization system 702 may indicate that one publisher within a network may have many shared IP addresses within another site, whose location does not fit the pattern of any other site within the network. This may indicate a strong likelihood that the abnormally located site is carrying out illegitimate activities, or modifying their behavior to appear as if they are indeed legitimate as being part of the first site. Fraud network determination classification system 714, therefore, may be configured to output fraud data that represents which fraud networks within the fraud network data are really fraudulent. In some embodiments, these sites may be barred from receiving advertisements, removed from the system entirely, and/or have a flag stored within publisher database 170 indicating that they have been classified as being fraudulent.

Figure 7B:
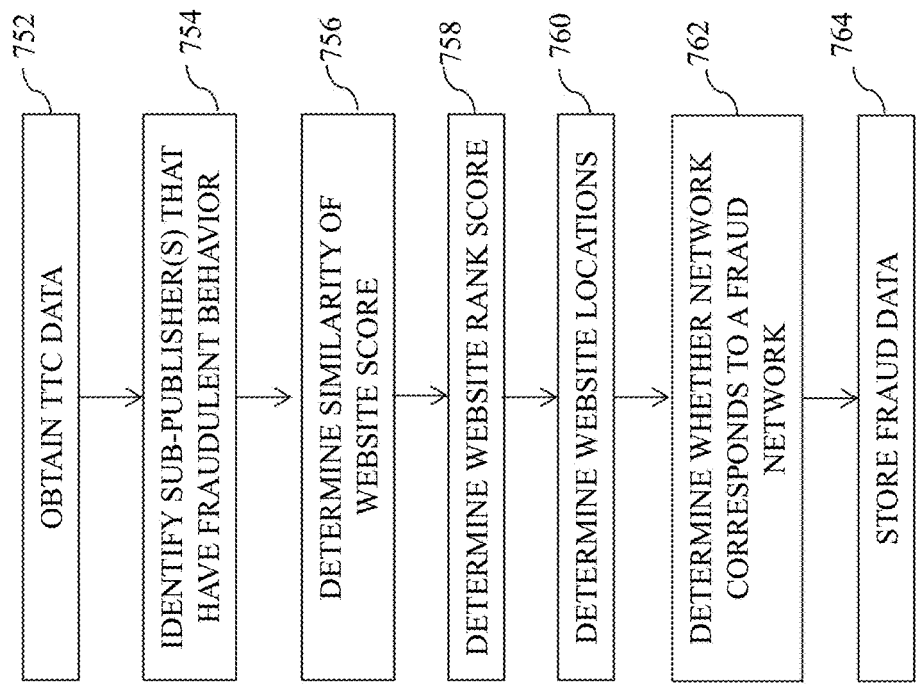
FIG. 7B is an illustrative flowchart of an exemplary process for classifying sites as being fraudulent, in accordance with various embodiments of the present teaching.

FIG. 7B is an illustrative flowchart of an exemplary process for classifying sites as being fraudulent, in accordance with various embodiments of the present teaching. Process 750 may begin, in one embodiment, at step 752. At step 752, TTC data may be obtained. For example, using user activity data from user activity database 150, TTC distribution generation system 708 may generate a TTC curve for a reviewed network, and TTC baseline distribution system 710 may generate a TTC baseline curve. TTC deviation system 706 may then compare the two to determine whether there are any abnormalities within the curves. In some embodiments, however, the TTC data may already be produced, and TTC deviation system 706 may perform the comparison without any of the TTC curve or baseline data being generated.

At step 754, sub-publishers that exhibit fraudulent behavior may be identified. For example, network visualization system 702 may determine one or more likely fraud networks, which may also be referred to herein as candidate fraud networks, based on fraud network data/cluster data received from network scoring system 230. The sub-publishers may correspond to one or more publishers with which a particular publisher shares a large number of shared IP addresses with, for example.

At step 756, a similarity of website score may be determined. For instance, website layout similarity determination system 704 may be configured to determine how similar two or more websites are to one another. In some embodiments, a fraudster may simply copy a website layout and/or style for multiple websites within a fraud network. Therefore, the score may indicate how likely two or more sites are similarly setup to one another. At step 758, a website rank score may be determined. For example, an Alexa rank, globally and/or locally, for a particular site under review may be determined. At step 760, website locations for a particular site under review may be determined. For example, sites may be pinged to determine an ISP of that site, and thus a location of the site.

At step 762, the data obtained from steps 752-760 may be employed to classify whether a particular network corresponds to a fraud network. For instance, fraud network determination classification system 714 may output fraud data indicating whether one or more publishers within a network are fraudulent publishers. At step 764, the fraud data may be stored. For example, the fraud data may be stored within publisher database 170. If a publisher is classified as being fraudulent, then that site may be removed from the system so as to prevent any advertisements or user traffic through the system to the site.

Figure 8:
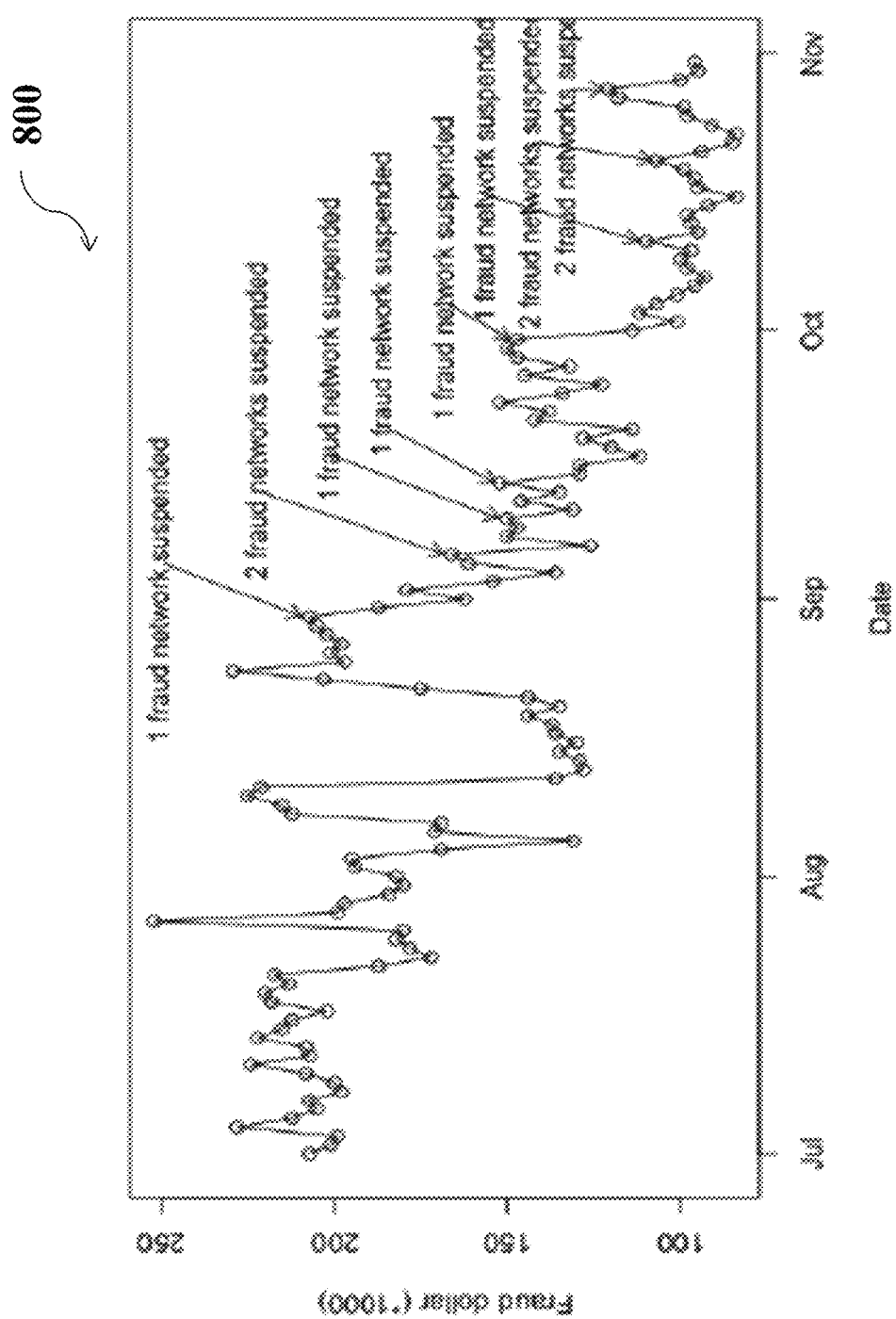
FIG. 8 is an illustrative graph of a time-series snapshot of when fraud networks identified, in accordance with various embodiments of the present teaching.

FIG. 8 is an illustrative graph of a time-series snapshot of when fraud networks identified, in accordance with various embodiments of the present teaching. Graph 800, for example, includes dates of when one or more fraud networks were identified using fraud network detection system 140. Furthermore, graph 800 includes fraudulent dollar values associated with each fraud network identified. When a fraud network is identified, that fraud network, for instance may be suspended. By employing fraud network detection system 140, as described herein, approximately $650K may be saved in fraudulent dollars. For example, this saving occurred by suspending 11 fraud networks identified within a four month time period.

Figure 9:
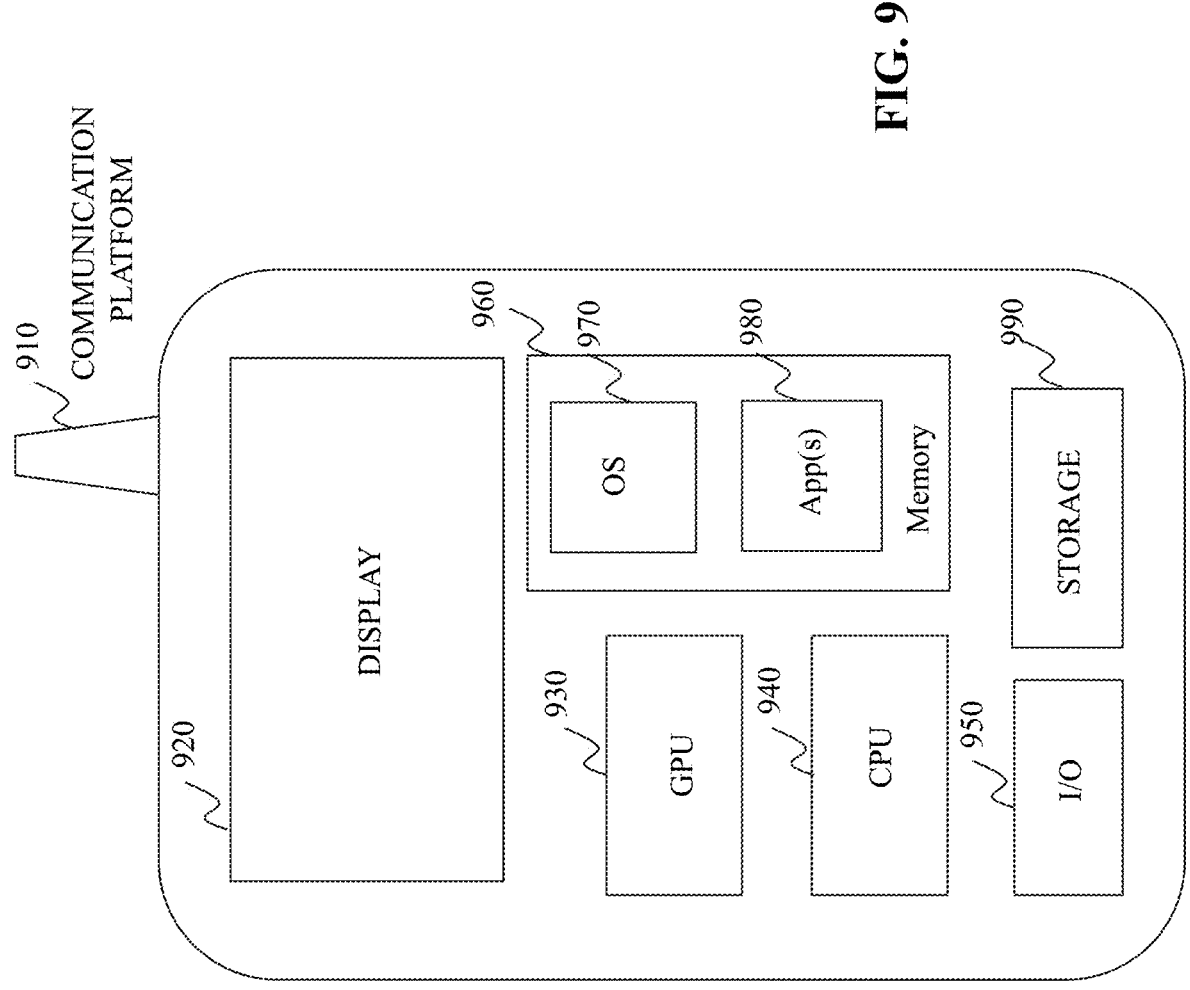
FIG. 9 is an illustrative diagram of an exemplary mobile device architecture that may be used to realize a specialized system implementing the present teaching in accordance with various embodiments.

FIG. 9 is an illustrative diagram of an exemplary mobile device architecture that may be used to realize a specialized system implementing the present teaching in accordance with various embodiments. In this example, the user device on which the fraudulent network detection systems and methods is implemented corresponds to a mobile device 900, including, but not limited to, a smart phone, a tablet, a music player, a handled gaming console, a global positioning system (GPS) receiver, and a wearable computing device (e.g., eyeglasses, wrist watch, etc.), or in any other form factor. Mobile device 900 may include one or more central processing units ("CPUs") 940, one or more graphic processing units ("GPUs") 930, a display 920, a memory 960, a communication platform 910, such as a wireless communication module, storage 990, and one or more input/output (I/O) devices 950. Any other suitable component, including but not limited to a system bus or a controller (not shown), may also be included in the mobile device 900. As shown in FIG. 9, a mobile operating system 970 (e.g., iOS, Android, Windows Phone, etc.), and one or more applications 980 may be loaded into memory 960 from storage 960 in order to be executed by the CPU 940. The applications 980 may include a browser or any other suitable mobile apps for determining fraudulent networks on mobile device 900. User interactions with the content may be achieved via the I/O devices 950 and provided to the publishers 130, content providers 160, and/or fraudulent network detection system 140 via network(s) 120. .

To implement various modules, units, and their functionalities described in the present disclosure, computer hardware platforms may be used as the hardware platform(s) for one or more of the elements described herein (e.g., content provider(s) 160, publisher(s) 130, fraudulent network detection system 140, and/or any other component of environments 100 and/or 150 with respect to FIGS. 1-7B). The hardware elements, operating systems and programming languages of such computers are conventional in nature, and it is presumed that those skilled in the art are adequately familiar therewith to adapt those technologies to detect fraudulent networks as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 10:
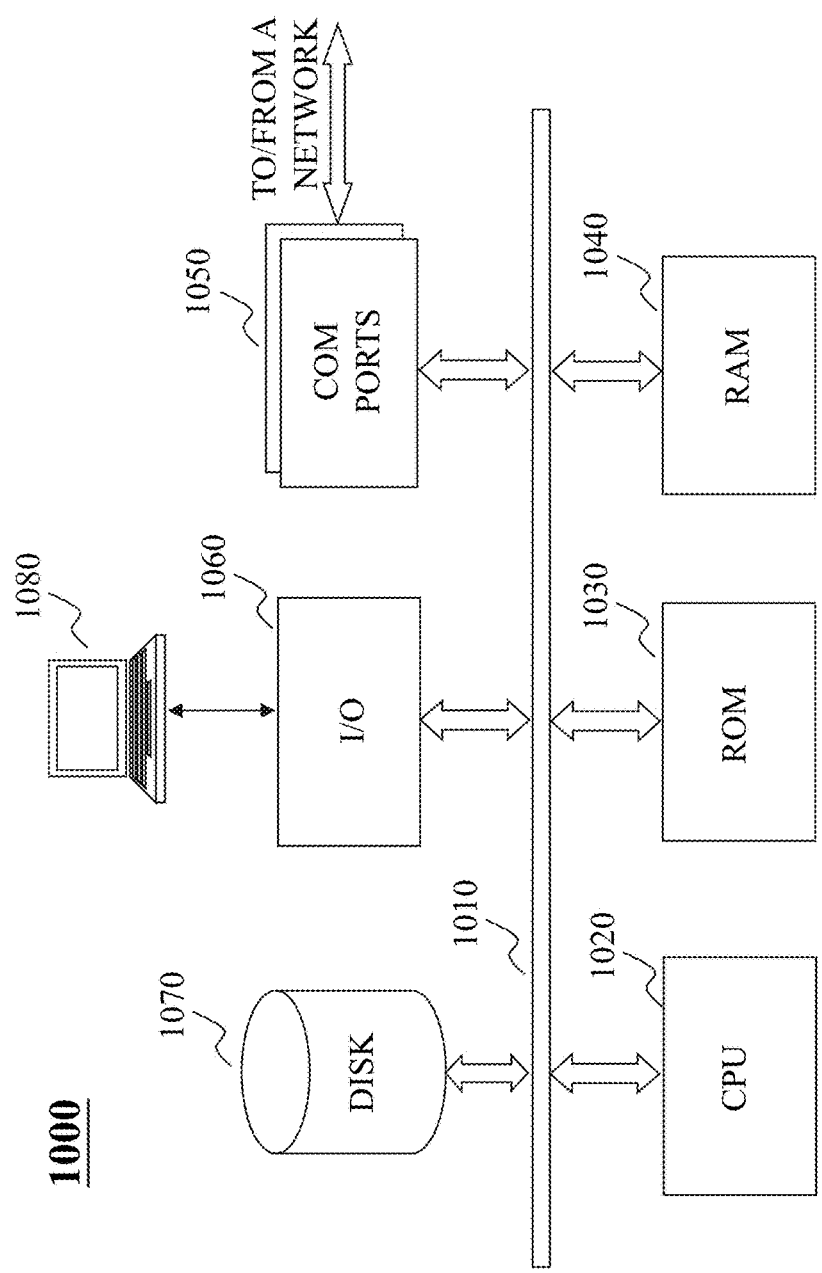
FIG. 10 is an illustrative diagram of an exemplary computing device architecture that may be used to realize a specialized system implementing the present teaching in accordance with various embodiments.

FIG. 10 is an illustrative diagram of an exemplary computing device architecture that may be used to realize a specialized system implementing the present teaching in accordance with various embodiments. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1000 may be used to implement any component of fraudulent network detection techniques, as described herein. For example, fraudulent network detection system may be implemented on a computer such as computer 1000, via its hardware, software program, firmware, or a combination thereof. Although only one such computer is shown, for convenience, the computer functions relating to fraudulent network detection as described herein may be implemented in a distributed fashion on a number of similar platforms, to distribute the processing load.

Computer 1000, for example, includes COM ports 1050 connected to and from a network connected thereto to facilitate data communications. Computer 1000 also includes a central processing unit (CPU) 1020, in the form of one or more processors, for executing program instructions. The exemplary computer platform includes an internal communication bus 1010, program storage and data storage of different forms (e.g., disk 1070, read only memory (ROM) 1030, or random access memory (RAM) 1040), for various data files to be processed and/or communicated by computer 1000, as well as possibly program instructions to be executed by CPU 1020. Computer 1000 also includes an I/O component 1060, supporting input/output flows between the computer and other components therein such as user interface elements 1080. Computer 1000 may also receive programming and data via network communications.

Hence, aspects of the methods of detecting fraudulent networks and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with detection fraudulent networks. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one computing system comprising at least one processor, memory, and communications circuitry for detecting fraudulent networks, the method comprising:
   obtaining, with the at least one processor, first data associated with a plurality of entities;
   generating, with the at least one processor, a representation characterizing similarities among the plurality of entities;
   identifying, with the at least one processor, based on the representation, at least one entity cluster as corresponding to a candidate fraud network;
   determining, with the at least one processor, a score associated with each of the at least one entity cluster, the score indicating a likelihood that a corresponding entity cluster represents a fraud network; and
   identifying, with the at least one processor, at least some of the at least one entity cluster as a fraud network based on the score, wherein an indicator is stored in a database to indicate that one or more websites associated with the at least one entity cluster correspond to the fraud network such that user activities associated with the one or more websites are severed.

2. The method of claim 1, wherein the first data comprises at least one of shared browser cookies, device identifiers, IP addresses, or user agent strings associated with the plurality of entities.

3. The method of claim 1, wherein the first data comprises IP addresses, the method further comprises:
  identifying, with the at least one processor, a first set of IP addresses associated with a first entity of the plurality of entities;
  identifying, with the at least one processor, a second set of IP address associated with a second entity of the plurality of entities; and
  determining, with the at least one processor, based on the first set of IP addresses and the second set of IP addresses, a number of overlapping IP addresses between the first entity and the second entity, wherein the score is based on the number of overlapping IP addresses and one of the first set of IP addresses or the second set of IP addresses.

4. The method of claim 1, wherein generating the representation comprises:
  generating, with the at least one processor, first graph data representing a bipartite graph, the bipartite graph comprising:
    a first group of nodes associated with one or more entities of the plurality, and
    a second group of nodes associated with IP addresses associated with user devices that visited the one or more entities; and
  generating, with the at least one processor, second graph data representing a unipartite graph comprising the first group of nodes and a corresponding score between each node of the first group of nodes, wherein the corresponding score is determined based on a number of overlapping IP addresses between two nodes of the first group of nodes.

5. The method of claim 1, wherein identifying the at least one entity cluster as corresponding to the candidate fraud network comprises:
  determining, with the at least one processor, high frequency nodes and low frequency nodes within the representation by evaluating a first function associated with each of a plurality of partitions associated with the representation;
  determining, with the at least one processor, a second function representing at least one minimized first function; and
  identifying, with the at least one processor, the at least one entity cluster based on the second function.

6. The method of claim 1, wherein the indicator comprises a fraud network flag, the method further comprises:
  providing, with the at least one processor, the fraud network flag, the score, and entity data associated with one or more entities corresponding to the at least one entity cluster to a review system; and
  determining, with the at least one processor, based on one or more parameters associated with the one or more entities, that the one or more entities comprise a true fraudulent network such that user activities associated with the one or more entities are severed.

7. The method of claim 1, further comprising:
  obtaining, with the at least one processor, time-to-click ("TTC") data representing time to click information associated with one or more advertisements rendered by a first entity of the plurality of entities;
  determining, with the at least one processor, website similarity data indicating website layout similarity associated with the one or more websites associated with the at least one entity cluster;
  determining, with the at least one processor, website ranking data associated with the one or more websites; and
  determining, with the at least one processor, location data associated with the one or more websites, wherein the indicator is stored in the database based on at least one of the TTC data, the website similarity data, the website ranking data, or the location data.

8. A system comprising at least one processor, memory, and communications circuitry for detecting fraudulent networks, the system comprising:
  a graph generation system, implemented by the at least one processor, configured to:
    obtain first data associated with a plurality of entities, and
    generate a representation characterizing similarities among the plurality of entites;
  a network identification system, implemented by the at least one processor, configured to identify, based on the representation, at least one entity cluster as corresponding to a candidate fraud network; and
  a network scoring system, implemented by the at least one processor, configured to:
    determine a score associated with each of the at least one entity cluster, the score indicating a likelihood that a corresponding entity cluster represents a fraud network, and
    identify at least some of the at least one entity cluster as a fraud network based on the score, wherein an indicator is stored in a database to indicate that one or more websites associated with the at least one entity cluster correspond to the fraud network such that user activities associated with the one or more websites are severed.

9. The system of claim 8, wherein the first data comprises at least one of shared browser cookies, device identifiers, IP addresses, or user agent strings associated with the plurality of entities.

10. The system of claim 8, wherein the graph generation system further comprises:
  a publisher vector representor, implemented by the at least one processor, configured to:
    identify a first set of IP addresses associated with a first entity of the plurality of entities, and
    a second set of IP address associated with a second entity of the plurality of entities; and
  a vector similarity detector, implemented by the at least one processor, configured to determine, based on the first set of IP addresses and the second set of IP addresses, a number of overlapping IP address between the first entity and the second entity, wherein the score is based on the number of overlapping IP addresses and one of the first set of IP addresses or the second set of IP addresses.

11. The system of claim 8, wherein graph generation system further comprises:
  a bipartite graph generator, implemented by the at least one processor, configured to generate first graph data representing a bipartite graph, the bipartite graph comprising:
    a first group of nodes associated with one or more entities of the plurality of entities, and
    a second group of nodes associated with IP addresses associated with user devices that visited the one or more entities; and
  a unipartite graph generator, implemented by the at least one processor, configured to generate generating second graph data representing a unipartite graph comprising the first group of nodes and a corresponding score between each node of the first group of nodes, wherein the corresponding score is determined based on a number of overlapping IP addresses between two nodes of the first group of nodes.

12. The system of claim 8, wherein the network identification system further comprises:
a graph partition system, implemented by the at least one processor, configured to partition the representation into a plurality of partitions;
a partition evaluation system, implemented by the at least one processor, configured to evaluate a first function associated with each of the plurality of partitions;
a graph partition length determination system, implemented by the at least one processor, configured to determine high frequency nodes and low frequency nodes within the representation based on the first function;
a minimum description length detector, implemented by the at least one processor, configured to determine a second function representing at least one minimized first function; and
a cluster identifier, implemented by the at least one processor, configured to the at least one entity cluster based on the second function.

13. The system of claim 8, wherein the indicator comprises a fraud network flag, the system further comprises:
a network review system, implemented by the at least one processor, wherein the network scoring system is further configured to provide the fraud network flag, the score, and entity data associated with one or more entities corresponding to the at least one entity cluster to a review system, and wherein the network review system is configured to:
determine, based on one or more parameters associated with the one or more entities, that the one or more entities comprise a true fraudulent network such that user activities associated with the one or more entities are severed.

14. The system of claim 8, further comprising:
a network review system, implemented by the at least one processor, comprising:
a time-to-click ("TTC") deviation system configured to obtain TTC data representing time to click information associated with one or more advertisements rendered by a first entity of the plurality of entities;
a website layout similarity determination system configured to determine website similarity data indicating website layout similarity associated with the one or more websites associated with the at least one entity cluster;
a publisher website rank and location system configured to:
website ranking data associated with the one or more websites, and
location data associated with the one or more websites; and
a fraud network determination classification system configured to store the indicator based on at least one of the TTC data, the website similarity data, the website ranking data, or the location data.

15. A non-transitory computer readable medium comprising instructions that, when executed by at least one processor of a computing system for detecting fraudulent networks, cause the computing system to perform operations comprising:

obtaining, with the at least one processor, first data associated with a plurality of entities;
generating, with the at least one processor, a representation characterizing similarities among the plurality of entities;
identifying, with the at least one processor, based on the representation, at least one entity cluster as corresponding to a candidate fraud network;
determining, with the at least one processor, a score associated with each of the at least one entity cluster, the score indicating a likelihood that a corresponding entity cluster represents a fraud network; and
identifying, with the at least one processor, at least some of the at least one entity cluster as a fraud network based on the score, wherein an indicator is stored in a database to indicate that one or more websites associated with the at least one entity cluster correspond to the fraud network such that user activities associated with the one or more websites are severed.

16. The non-transitory computer readable medium of claim 15, wherein the first data comprises IP addresses, the operations further comprise:
identifying, with the at least one processor, a first set of IP addresses associated with a first entity of the plurality of entites;
identifying, with the at least one processor, a second set of IP address associated with a second entity of the plurality of of entities; and
determining, with the at least one processor, based on the first set of IP addresses and the second set of IP addresses, a number of overlapping IP address between the first entity and the second entity, wherein the score is based on the number of overlapping IP addresses and one of the first set of IP addresses and the second set of IP addresses.

17. The non-transitory computer readable medium of claim 15, wherein generating the representation comprises:
generating, with the at least one processor, first graph data representing a bipartite graph, the bipartite graph comprising:
a first group of nodes associated with one or more entities of the plurality of entities, and
a second group of nodes associated with IP addresses associated with user devices that visited the one or more entities; and
generating, with the at least one processor, second graph data representing a unipartite graph comprising the first group of nodes and a corresponding score between each node of the first group of nodes, wherein the corresponding score is determined based on a number of overlapping IP addresses between two nodes of the first group of nodes.

18. The non-transitory computer readable medium of claim 15, wherein identifying the at least one entity cluster as corresponding to the candidate fraud network comprises:
determining, with the at least one processor, high frequency nodes and low frequency nodes within the representation by evaluating a first function associated with each of a plurality of partitions associated with the representation;
determining, with the at least one processor, a second function representing at least one minimized first function; and
identifying, with the at least one processor, the at least one entity cluster based on the second function.

19. The non-transitory computer readable medium of claim 15, wherein the indicator comprises a fraud network flag, the operations further comprise:
- providing, with the at least one processor, the fraud network flag, the score, and entity data associated with one or more entities corresponding to the at least one entity cluster to a review system; and
- determining, with the at least one processor, based on one or more parameters associated with the one or more entities, that the one or more entities comprises a true fraudulent network such that user activities associated with the one or more entities are severed.

20. The non-transitory computer readable medium of claim 15, wherein the operations further comprise:
- obtaining, with the at least one processor, time-to-click ("TTC") data representing time to click information associated with one or more advertisements rendered by a first entity of the plurality of entities;
- determining, with the at least one processor, website similarity data indicating website layout similarity associated with one or more websites associated with the at least one entity cluster;
- determining, with the at least one processor, website ranking data associated with the one or more web sites; and
- determining, with the at least one processor, location data associated with the one or more websites, wherein the indicator is stored in the database based on at least one of the TTC data, the website similarity data, the website ranking data, or the location data.

* * * * *